United States Patent
Yamamoto

(10) Patent No.: US 8,300,012 B2
(45) Date of Patent: Oct. 30, 2012

(54) INPUT APPARATUS, CONTROL APPARATUS, CONTROL SYSTEM, AND CONTROL METHOD

(75) Inventor: Kazuyuki Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 624 days.

(21) Appl. No.: 12/544,725

(22) Filed: Aug. 20, 2009

(65) Prior Publication Data

US 2010/0045599 A1 Feb. 25, 2010

(30) Foreign Application Priority Data

Aug. 22, 2008 (JP) ................................. 2008-214194

(51) Int. Cl.
G06F 3/033 (2006.01)
(52) U.S. Cl. ........................................................ 345/158
(58) Field of Classification Search ........................ None
See application file for complete search history.

(56) References Cited

U.S. PATENT DOCUMENTS

| | | | |
|---|---|---|---|
| 5,453,758 A | | 9/1995 | Sato |
| 5,485,203 A | * | 1/1996 | Nakamura et al. ............ 348/263 |
| 5,786,872 A | * | 7/1998 | Miyazaki et al. ............. 348/669 |
| 6,573,930 B2 | * | 6/2003 | Kyuma et al. ............... 348/208.5 |
| 2007/0182700 A1 | * | 8/2007 | Baba et al. ..................... 345/102 |
| 2010/0033583 A1 | * | 2/2010 | Tomita et al. ............... 348/208.5 |
| 2010/0045599 A1 | * | 2/2010 | Yamamoto ................... 345/158 |

FOREIGN PATENT DOCUMENTS

| | | |
|---|---|---|
| JP | 04-271393 | 9/1992 |
| JP | 04-291622 | 10/1992 |
| JP | 08-259195 | 9/1994 |
| JP | 07-222027 | 8/1995 |
| JP | 08-154284 | 6/1996 |
| JP | 08-211995 | 8/1996 |
| JP | 09-190275 | 7/1997 |
| JP | 09-269869 | 10/1997 |
| JP | 10-327477 | 12/1998 |
| JP | 3748483 | 3/1999 |
| JP | 11-196479 | 7/1999 |
| JP | 2002-062981 | 2/2002 |
| JP | 2004-334903 | 11/2004 |
| JP | 2009-147915 | 7/2009 |
| JP | 200156743 | 8/2009 |

OTHER PUBLICATIONS

Japanese Office Action issued May 15, 2012, corresponding to Japanese Appln. No. 2008-214194.

* cited by examiner

*Primary Examiner* — Peter Vincent Agustin
(74) *Attorney, Agent, or Firm* — K&L Gates LLP

(57) ABSTRACT

An input apparatus includes a sensor, a calculation section, and a transmission section. The sensor detects a movement of the input apparatus and outputs a detection signal corresponding to the movement of the input apparatus. The calculation section calculates a corresponding value that corresponds to a movement of an image displayed on a screen in a predetermined calculation cycle, the corresponding value corresponding to the detection signal. The transmission section transmits the corresponding value in a transmission cycle shorter than the calculation cycle.

5 Claims, 30 Drawing Sheets

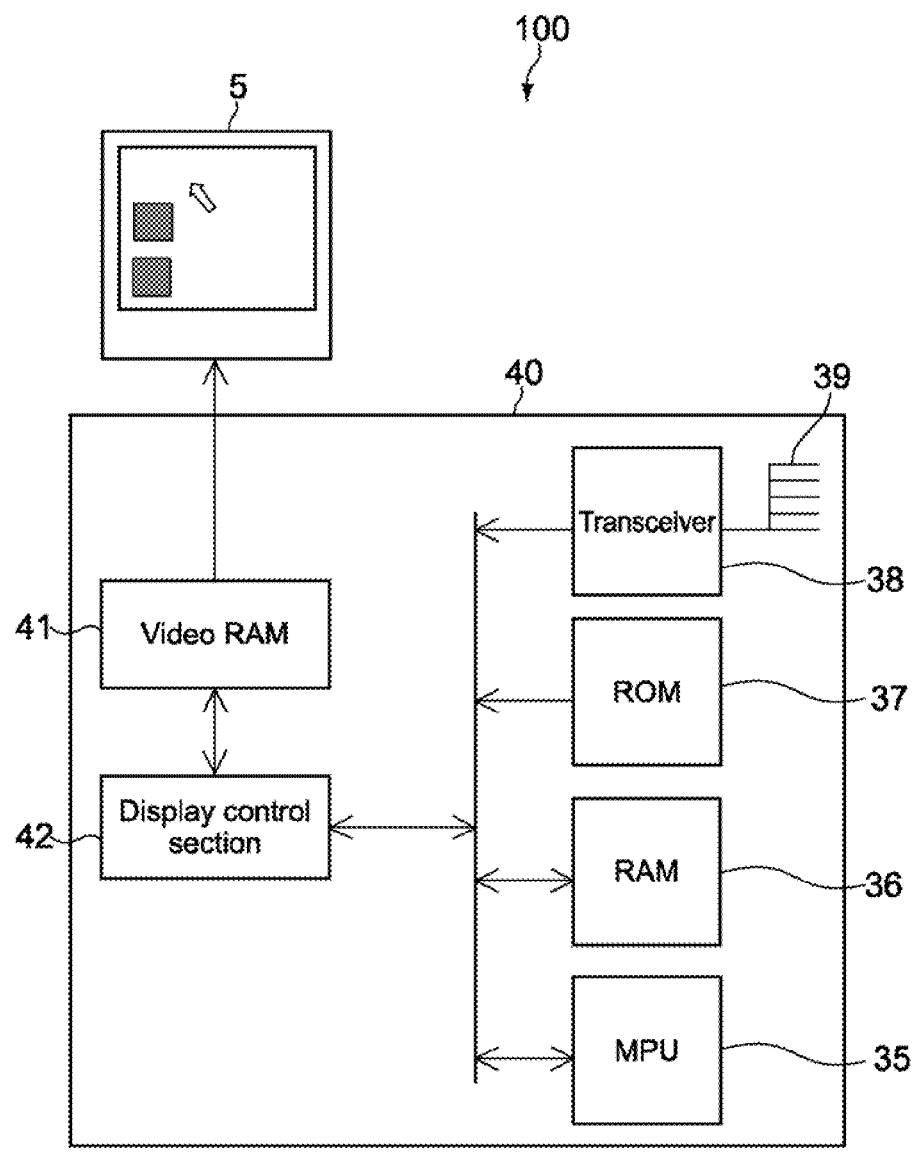
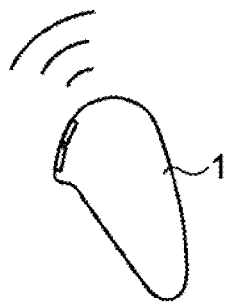
FIG.1

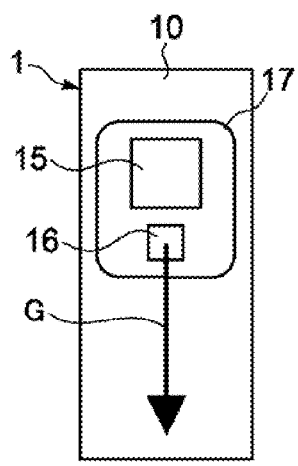
FIG.26A
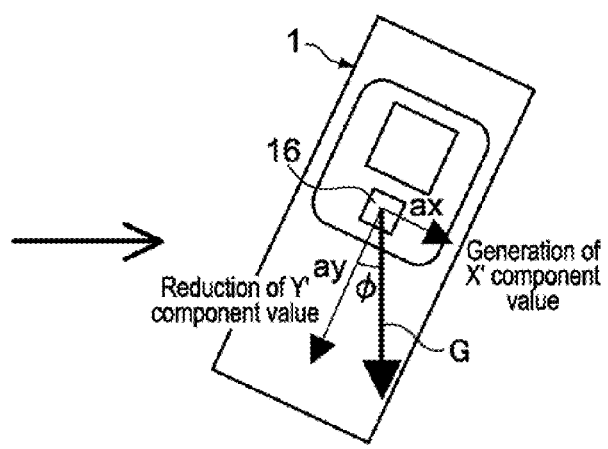
FIG.26B
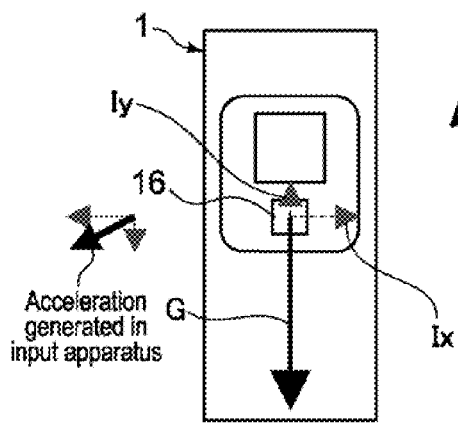
FIG.26C
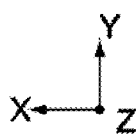

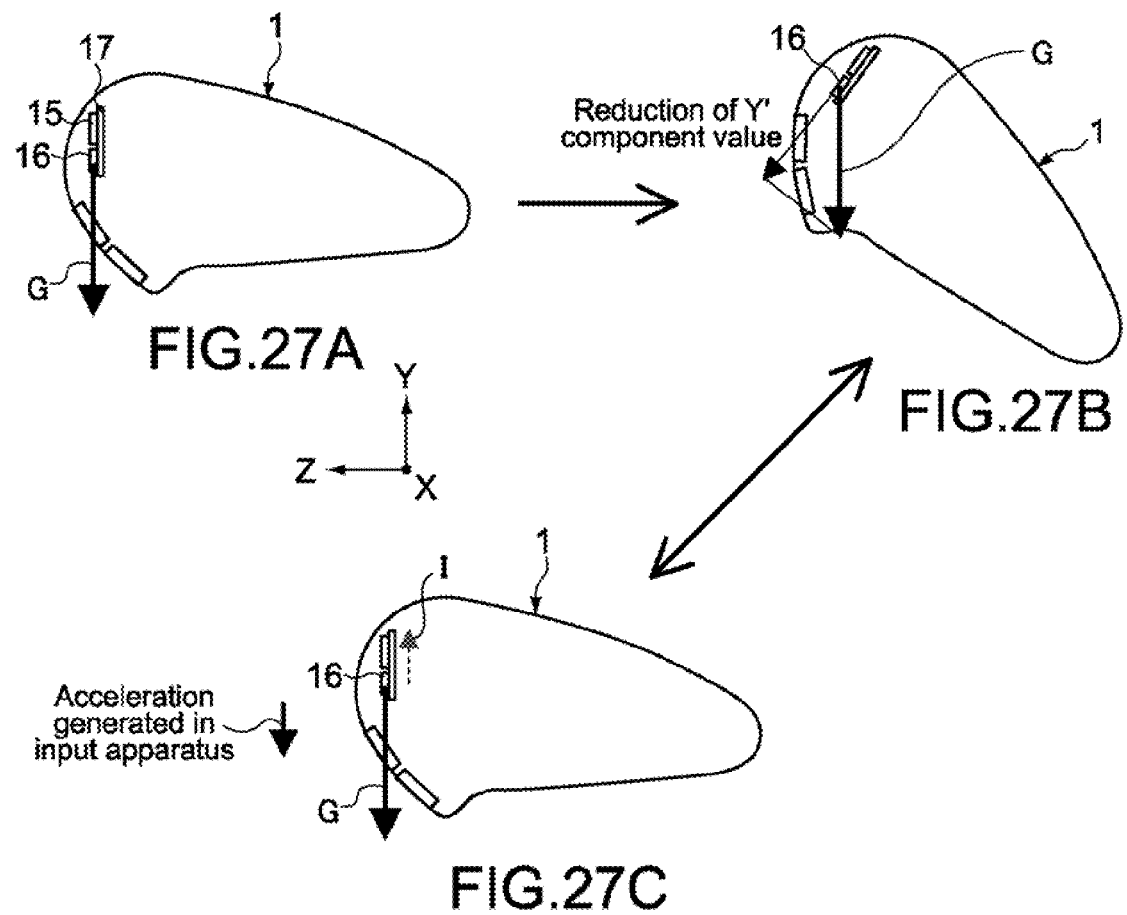

INPUT APPARATUS, CONTROL APPARATUS, CONTROL SYSTEM, AND CONTROL METHOD

CROSS REFERENCES TO RELATED APPLICATIONS

The present application contains subject matter related to that disclosed in Japanese Priority Patent Application JP 2008-214194 filed in the Japan Patent Office on Aug. 22, 2008, the entire content of which is hereby incorporated by reference.

BACKGROUND

The present invention relates to a 3-dimensional operation input apparatus for operating a GUI (Graphical User Interface), a control apparatus for controlling the GUI in accordance with information transmitted from the input apparatus, a control system including those apparatuses, and a control method.

Pointing devices, particularly a mouse and a touchpad, are used as controllers for GUIs widely used in PCs (Personal Computers). Not just as HIs (Human Interfaces) of PCs as in related art, the GUIs are now starting to be used as an interface for AV equipment and game devices used in living rooms etc. with, for example, televisions as image media. Various input apparatuses that a user is capable of operating 3-dimensionally are proposed as controllers for the GUIs of this type (see, for example, Japanese Patent Application Laid-open No. 2001-56743 (paragraphs [0030] and [0045], FIG. 2) and Japanese Patent No. 3,748,483 (paragraphs [0098] to [0103], FIGS. 7 and 8), hereinafter, referred to as Patent Document 1 and Patent Document 2, respectively).

Patent Document 1 discloses an input apparatus including angular velocity gyroscopes of two axes, that is, two angular velocity sensors. When a user holds the input apparatus in hand and swings it vertically and laterally, for example, the angular velocity sensors detect angular velocities about two orthogonal axes, and a command signal as positional information of a cursor (pointer) or the like displayed by a display means is generated in accordance with the angular velocities. The command signal is transmitted to a control apparatus, and the control apparatus controls display so that the cursor moves on a screen in response to the command signal.

Patent Document 2 discloses a pen-type input apparatus including three (triaxial) acceleration sensors and three (triaxial) angular velocity sensors (gyro). The pen-type input apparatus executes various operations based on signals obtained by the three acceleration sensors and three angular velocity sensors, to thus calculate and output a positional angle of the pen-type input apparatus. Alternatively, the pen-type input apparatus executes various operations to calculate and output movement amounts at a pen tip of the pen-type input apparatus.

SUMMARY

As described above, in the pen-type input apparatus disclosed in Patent Document 2, the movement amounts at the pen tip of the input apparatus are calculated by executing various operations based on six signals obtained by the three angular velocity sensors and three acceleration sensors. Therefore, there is a problem that an operation up to calculating the movement amounts of the input apparatus becomes complex and a time required for calculating the movement amounts is thus prolonged. Prolongation of the time up to calculating the movement amounts leads to prolongation of a cycle in which the input apparatus outputs information on the next movement amounts since having output information on the previous movement amounts.

Prolongation of the cycle of outputting information on the movement amounts leads to prolongation of a cycle in which a control apparatus receives the information on the movement amounts. For example, the control apparatus plots an image so that a pointer on a screen moves in accordance with the movement amounts every time the information on the movement amounts is received. Therefore, prolongation of a reception cycle of the movement amounts results in prolongation of a cycle of starting next plotting so as to move the pointer since having plotted last time to move the pointer. Consequently, there arises a problem that display cannot be made so as to smoothly move the pointer on the screen.

Here, the problem that the time required for calculating the movement amounts is prolonged may be caused by factors other than complexity of the operation of the input apparatus. For example, in a case where an inexpensive control system having low throughput is used for competitively pricing the input apparatus, a time required for calculating movement amounts may become long, with the result that display cannot be made to smoothly move a pointer on a screen as in the above case.

Moreover, in a case where processing of scroll, zoom, or the like of an image displayed on a screen is executed based on movement amounts of the input apparatus, for example, the scroll, zoom, or the like of the image displayed on the screen cannot be displayed smoothly when the cycle of calculating movement amounts is prolonged.

In view of the circumstances as described above, there is a need for an input apparatus, a control apparatus, a control system, and a control method that are capable of making a movement of an image smooth.

According to an embodiment, there is provided an input apparatus including a sensor, a calculation means, and a transmission section.

The sensor detects a movement of the input apparatus and outputs a detection signal corresponding to the movement of the input apparatus.

The calculation means calculates a corresponding value that corresponds to a movement of an image displayed on a screen in a predetermined calculation cycle, the corresponding value corresponding to the detection signal.

The transmission section transmits the corresponding value in a transmission cycle shorter than the calculation cycle.

The "image displayed on a screen" refers to an image displayed on a full screen or a part of the screen. The "image" includes a pointer and images including letters and figures. Examples of the "movement of the image" include a movement of a pointer, scroll of an image, zoom of an image, rotation of an image, and other movements.

In an embodiment, information on the corresponding value is transmitted in a cycle shorter than a cycle of calculating the corresponding value. Accordingly, even when the calculation cycle is prolonged, display can be made to smoothly move the image on the screen. In addition, since an inexpensive control system can be used for the input apparatus, costs can be reduced.

The input apparatus may further include a memory and an update means.

The memory stores the calculated corresponding value.

The update means updates the corresponding value stored in the memory every time the corresponding value is calculated.

In this case, the transmission section may read and transmit the corresponding value stored in the memory in the transmission cycle.

For example, in a case where the corresponding value is calculated by a complex operation, the calculation cycle may fluctuate more or less. In an embodiment, since the transmission section reads and transmits the corresponding value stored in the memory in a regular transmission cycle even when the calculated corresponding value is stored in the memory in a somewhat irregular cycle, the input apparatus can maintain a regular transmission cycle.

The input apparatus may further include a judgment means and a restriction means.

The judgment means judges whether the corresponding value is equal to or smaller than a predetermined threshold value.

The restriction means restricts the transmission of the corresponding value when the corresponding value is equal to or smaller than the predetermined threshold value.

In an embodiment, the "threshold value" is 0 or a value close to 0. Moreover, the corresponding value judged by the judgment means is typically an absolute value.

When the input apparatus transmits information on the corresponding value by wireless communication, there is a problem that power consumption thereof is large. When the corresponding value is 0 or a value close to 0, for example, even when the corresponding value is transmitted, the image does not move or hardly moves on the screen. Therefore, necessity of the input apparatus to transmit the corresponding value is low. In the embodiment of the present invention, since the transmission of the corresponding value is restricted when the corresponding value is 0 or almost 0, power saving of the input apparatus can be realized.

According to another embodiment, there is provided an input apparatus including a sensor, a transmission section, and a cycle control means.

The sensor detects a movement of the input apparatus and outputs a detection signal corresponding to the movement of the input apparatus.

The transmission section transmits a corresponding value that corresponds to a movement of an image displayed on a screen in a predetermined transmission cycle, the corresponding value corresponding to the detection signal.

The cycle control means variably controls the transmission cycle.

In an embodiment, by variably controlling the transmission cycle, power consumption of the input apparatus can be reduced appropriately without the user feeling awkwardness regarding smoothness of the movement of the image displayed on the screen.

In the input apparatus, the cycle control means may variably control the transmission cycle in accordance with the corresponding value.

The input apparatus may further include a judgment means.

The judgment means judges whether the corresponding value is equal to or smaller than a predetermined threshold value.

In this case, the cycle control means controls the transmission cycle to be prolonged when the corresponding value is equal to or smaller than the predetermined threshold value.

In an embodiment, the "threshold value" is a value in a range in which a user does not feel awkwardness regarding the smoothness of the movement of the image. Moreover, the corresponding value judged by the judgment means is typically an absolute value.

For example, if the cycle of plotting the movement of the image on the screen is long when the corresponding value is large, human beings tend to feel awkwardness regarding the smoothness of the movement of the image. On the other hand, if the cycle of plotting the image on the screen is short when the corresponding value is small, human beings hardly feel awkwardness regarding the smoothness of the movement of the image.

This embodiment uses this relationship and prolongs the transmission cycle when the corresponding value is small. Accordingly, power consumption of the input apparatus can be reduced appropriately without the user feeling awkwardness regarding the smoothness of the movement of the image.

In the input apparatus, the cycle control means may control the transmission cycle to be prolonged as the corresponding value decreases when the corresponding value is equal to or smaller than the predetermined threshold value.

The cycle control means may prolong the transmission cycle stepwise or linear-functionally as the corresponding value decreases when the corresponding value is equal to or smaller than the predetermined threshold value. Alternatively, the cycle control means may prolong the transmission cycle by a multi-degree function or exponentially.

Accordingly, power consumption of the input apparatus can be reduced appropriately without the user feeling awkwardness regarding the smoothness of the movement of the image.

In the input apparatus, the judgment means may judge whether the corresponding value is equal to or smaller than 0 or a value close to 0.

In this case, the cycle control means may control the transmission cycle to become infinite when the corresponding value is equal to or smaller than 0 or a value close to 0.

In an embodiment, the threshold value is 0 or a value close to 0.

When the corresponding value is 0 or a value close to 0, for example, even when the corresponding value is transmitted, the image does not move or hardly moves on the screen. Therefore, necessity of the input apparatus to transmit the corresponding value is low. In the embodiment of the present invention, since the transmission cycle is set to be infinite and the transmission of the corresponding value is restricted when the corresponding value is 0 or almost 0, power consumption of the input apparatus can be reduced.

The input apparatus may further include a judgment means.

The judgment means judges whether the corresponding value is equal to or larger than a predetermined threshold value.

In this case, the cycle control means controls the transmission cycle to be prolonged when the corresponding value is equal to or larger than the predetermined threshold value.

In the embodiment of the present invention, the "threshold value" is a value in a range in which a user does not feel awkwardness regarding the smoothness of the movement of the image. Moreover, the corresponding value judged by the judgment means is typically an absolute value.

For example, in a case where the movement of the image is extremely large, even if the cycle of plotting the movement of the image is long, human beings hardly feel awkwardness regarding the smoothness of the movement of the image. Alternatively, it may be imperceptible since the movement of the image is too fast.

This embodiment uses this relationship and controls the transmission cycle to be prolonged when the corresponding value is equal to or larger than the threshold value. Accordingly, since the transmission cycle is prolonged when the movement of the image is extremely fast, power consumption of the input apparatus can be reduced appropriately without the user feeling awkwardness regarding the smoothness of the movement of the image.

In the input apparatus, the cycle control means may control the transmission cycle to be prolonged as the corresponding value increases when the corresponding value is equal to or larger than the predetermined threshold value.

The cycle control means may prolong the transmission cycle stepwise or linear-functionally as the corresponding value increases when the corresponding value is equal to or larger than the predetermined threshold value. Alternatively, the cycle control means may prolong the transmission cycle by a multi-degree function or exponentially.

Accordingly, power consumption of the input apparatus can be reduced appropriately without the user feeling awkwardness regarding the smoothness of the movement of the image.

According to an embodiment, there is provided a control apparatus including a reception section and a display control means.

The reception section receives a corresponding value that corresponds to a movement of an image displayed on a screen in a predetermined reception cycle.

The display control means controls display of the screen so that the movement of the image is plotted in accordance with the corresponding value in a plotting cycle shorter than the reception cycle.

In an embodiment, the movement of the image can be plotted in a plotting cycle shorter than the reception cycle. Accordingly, the image can be displayed so as to smoothly move on the screen even when the reception cycle becomes long.

The control apparatus may further include a memory and an update means.

The memory stores the received corresponding value.

The update means updates the corresponding value stored in the memory every time the corresponding value is received.

In this case, the display control means controls the display of the screen so that the movement of the image is plotted in the plotting cycle in accordance with the corresponding value stored in the memory during a period from a time when the corresponding value is received to a time when the next corresponding value is received.

The control apparatus may further include a curve calculation means.

The curve calculation means calculates a regression curve based on the corresponding value stored in the memory.

In this case, the display control means controls the display of the screen so that the movement of the image is plotted in accordance with the regression curve.

Accordingly, the movement of the image on the screen can be made smoother.

The control apparatus may further include a count means and a time judgment means.

The count means counts a time from the time when the corresponding value is received to the time when the next corresponding value is received.

The time judgment means judges whether the time is equal to or longer than a predetermined time.

In this case, the display control means controls the display of the screen so that the movement of the image on the screen is stopped when the time is equal to or longer than the predetermined time.

In the embodiment of the present invention, the movement of the image is stopped when the time from the reception of the corresponding value to the reception of the next corresponding value is equal to or longer than the predetermined time. Accordingly, it is possible to prevent the control apparatus from moving the image continuously in accordance with the corresponding value stored in the memory even when the transmission of the corresponding value from the input apparatus is stopped.

According to another embodiment of the present invention, there is provided a control apparatus including a reception section, a display control means, and a cycle control means.

The reception section receives a corresponding value that corresponds to a movement of an image displayed on a screen.

The display control means controls display of the screen so that the movement of the image is plotted in accordance with the corresponding value in a predetermined plotting cycle.

The cycle control means variably controls the plotting cycle.

Accordingly, the movement of the image can be plotted smoothly without the user feeling awkward.

In the control apparatus, the cycle control means may variably control the plotting cycle in accordance with the corresponding value.

The control apparatus may further include a judgment means.

The judgment means judges whether the corresponding value is equal to or smaller than a predetermined threshold value.

In this case, the cycle control means controls the plotting cycle to be prolonged when the corresponding value is equal to or smaller than the predetermined threshold value.

In the embodiment of the present invention, the "threshold value" is a value in a range in which a user does not feel awkwardness regarding the smoothness of the movement of the image. Moreover, the corresponding value judged by the judgment means is typically an absolute value.

Accordingly, the movement of the image can be plotted smoothly without the user feeling awkward.

In the control apparatus, the cycle control means may control the plotting cycle to be prolonged as the corresponding value decreases when the corresponding value is equal to or smaller than the predetermined threshold value.

Accordingly, the movement of the image can be plotted smoothly without the user feeling awkward.

In the control apparatus, the judgment means may judge whether the corresponding value is equal to or smaller than 0 or a value close to 0.

In this case, the cycle control means may control the plotting cycle to become infinite when the corresponding value is equal to or smaller than 0 or a value close to 0.

The control apparatus may further include a judgment means.

The judgment means judges whether the corresponding value is equal to or larger than a predetermined threshold value.

In this case, the cycle control means controls the plotting cycle to be prolonged when the corresponding value is equal to or larger than the predetermined threshold value.

In the embodiment of the present invention, the "threshold value" is a value in a range in which a user does not feel awkwardness regarding the smoothness of the movement of the image. Moreover, the corresponding value judged by the judgment means is typically an absolute value.

Accordingly, the movement of the image can be plotted smoothly without the user feeling awkward.

In the control apparatus, the cycle control means may control the plotting cycle to be prolonged as the corresponding value increases when the corresponding value is equal to or larger than the predetermined threshold value.

Accordingly, the movement of the image can be plotted smoothly without the user feeling awkward.

According to an embodiment of the present invention, there is provided a control system including an input apparatus and a control apparatus.

The input apparatus includes a sensor, a calculation means, and a transmission section.

The sensor detects a movement of the input apparatus and outputs a detection signal corresponding to the movement of the input apparatus.

The calculation means calculates a corresponding value that corresponds to a movement of an image displayed on a screen in a predetermined calculation cycle, the corresponding value corresponding to the detection signal.

The transmission section transmits the corresponding value in a transmission cycle shorter than the calculation cycle.

The control apparatus includes a reception section and a display control means.

The reception section receives the transmitted corresponding value.

The display control means controls display of the screen so that the movement of the image is plotted in accordance with the corresponding value.

According to another embodiment of the present invention, there is provided a control system including an input apparatus and a control apparatus.

The input apparatus includes a sensor, a transmission section, and a cycle control means.

The sensor detects a movement of the input apparatus and outputs a detection signal corresponding to the movement of the input apparatus.

The transmission section transmits a corresponding value that corresponds to a movement of an image displayed on a screen in a predetermined transmission cycle, the corresponding value corresponding to the detection signal.

The cycle control means variably controls the transmission cycle.

The control apparatus includes a reception section and a display control means.

The reception section receives the transmitted corresponding value,

The display control means controls display of the screen so that the movement of the image is plotted in accordance with the corresponding value.

According to another embodiment, there is provided a control system including an input apparatus and a control apparatus.

The input apparatus includes a sensor and a transmission section.

The sensor detects a movement of the input apparatus and outputs a detection signal corresponding to the movement of the input apparatus.

The transmission section transmits a corresponding value that corresponds to a movement of an image displayed on a screen, the corresponding value corresponding to the detection signal.

The control apparatus includes a reception section and a display control means.

The reception section receives the transmitted corresponding value in a predetermined reception cycle.

The display control means controls display of the screen so that the movement of the image is plotted in accordance with the corresponding value in a plotting cycle shorter than the reception cycle.

According to another embodiment, there is provided a control system including an input apparatus and a control apparatus.

The input apparatus includes a sensor and a transmission section.

The sensor detects a movement of the input apparatus and outputs a detection signal corresponding to the movement of the input apparatus.

The transmission section transmits a corresponding value that corresponds to a movement of an image displayed on a screen, the corresponding value corresponding to the detection signal.

The control apparatus includes a reception section, a display control means, and a cycle control means.

The reception section receives the transmitted corresponding value.

The display control means controls display of the screen so that the movement of the image is plotted in accordance with the corresponding value in a predetermined plotting cycle.

The cycle control means variably controls the plotting cycle.

According to an embodiment, there is provided a control method including detecting a movement of an input apparatus and outputting a detection signal corresponding to the movement of the input apparatus.

A corresponding value that corresponds to a movement of an image displayed on a screen is calculated in a predetermined calculation cycle, the corresponding value corresponding to the output detection signal.

The corresponding value is transmitted in a transmission cycle shorter than the calculation cycle.

According to another embodiment of the present invention, there is provided a control method including detecting a movement of an input apparatus and outputting a detection signal corresponding to the movement of the input apparatus.

A corresponding value that corresponds to a movement of an image displayed on a screen is transmitted in a predetermined transmission cycle, the corresponding value corresponding to the output detection signal.

The transmission cycle is controlled variably.

According to another embodiment, there is provided a control method including receiving a corresponding value that corresponds to a movement of an image displayed on a screen in a predetermined reception cycle.

Display of the screen is controlled so that the movement of the image is plotted in accordance with the corresponding value in a plotting cycle shorter than the reception cycle.

According to another embodiment, there is provided a control method including receiving a corresponding value that corresponds to a movement of an image displayed on a screen.

Display of the screen is controlled so that the movement of the image is plotted in accordance with the corresponding value in a predetermined plotting cycle.

The plotting cycle is controlled variably.

In the descriptions above, elements described as " . . . means" may be realized by hardware or both software and hardware. When the elements are realized by both software and hardware, the hardware includes at least a storage device for storing software programs.

Typically, hardware is structured by selectively using at least one of a CPU (Central Processing Unit), an MPU (Micro Processing Unit), a RAM (Random Access Memory), a ROM (Read Only Memory), a DSP (Digital Signal Processor), an FPGA (Field Programmable Gate Array), an ASIC (Application Specific Integrated Circuit), a NIC (Network Interface Card), a WNIC (Wireless NIC), a modem, an optical disc, a magnetic disc, and a flash memory.

As described above, according to the embodiments of the present invention, an input apparatus, a control apparatus, a control system, and a control method that are capable of making a movement of an image smooth can be provided.

Additional features and advantages are described herein, and will be apparent from the following Detailed Description and the figures.

BRIEF DESCRIPTION OF THE FIGURES

FIG. 1 is a diagram showing a control system according to an embodiment;

FIG. 26 are diagrams for illustrating a gravitational effect with respect to an acceleration sensor unit;

FIG. 27 are diagrams for illustrating an effect of gravity accelerations at a time when the input apparatus is swung in a pitch direction;

DETAILED DESCRIPTION

The present application will be described with reference to the drawings according to an embodiment.

FIG. 1 is a diagram showing a control system according to an embodiment of the present invention. A control system 100 includes a display apparatus 5, a control apparatus 40, and an input apparatus 1.

Figure 2:
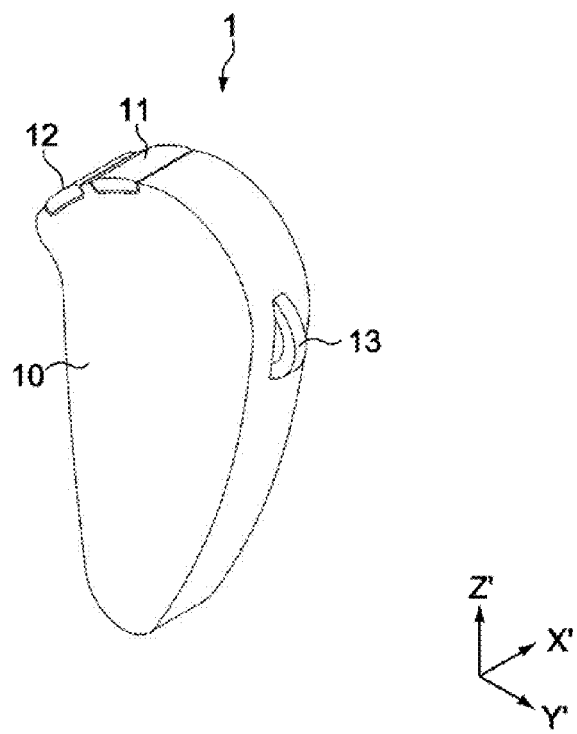
FIG. 2 is a perspective diagram showing an input apparatus according to the embodiment.

FIG. 2 is a perspective diagram showing the input apparatus 1. The input apparatus 1 is of a size that a user is capable of holding. The input apparatus 1 includes a casing 10. Further, the input apparatus 1 includes an operation section 23 including a button 11 provided at a center of an upper portion of the casing 10, a button 12 adjacent to the button 11, and a rotary wheel button 13 (see FIG. 6).

Typically, the buttons 11 and 12 are each a press-type button, and push buttons or capacitance-type touch buttons are used. However, the operation section 23 is not limited thereto, and a bar-type operation section 23 that is operated with one end as a fulcrum or a slide-type operation section 23 may be used instead.

The button 11 has a function corresponding to a left button of a mouse as an input device used for a PC, and the button 12 adjacent to the button 11 has a function corresponding to a right button of a mouse, for example. For example, an operation of selecting an icon 4 (see FIG. 5) may be carried out by clicking the button 11 and an operation of opening a tile may be carried out by double-clicking the button 11. The icons are images on the screen 3 representing functions of programs, execution commands, file contents, and the like on the computer.

Figure 3:
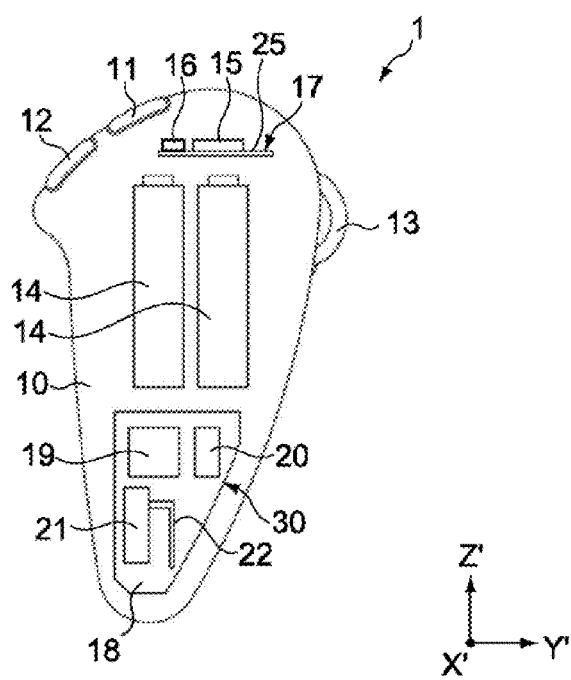
FIG. 3 is a diagram schematically showing an internal structure of the input apparatus.
Figure 4:
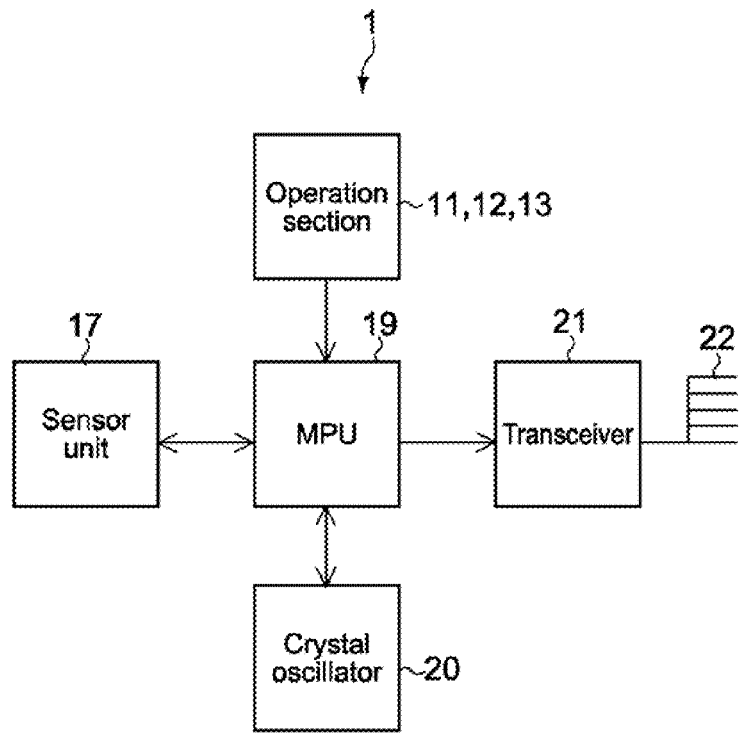
FIG. 4 is a block diagram showing an electrical structure of the input apparatus.

FIG. 3 is a diagram schematically showing an internal structure of the input apparatus 1. FIG. 4 is a block diagram showing an electrical structure of the input apparatus 1.

The input apparatus 1 includes a sensor unit 17, a control unit 30, and batteries 14.

Figure 8:
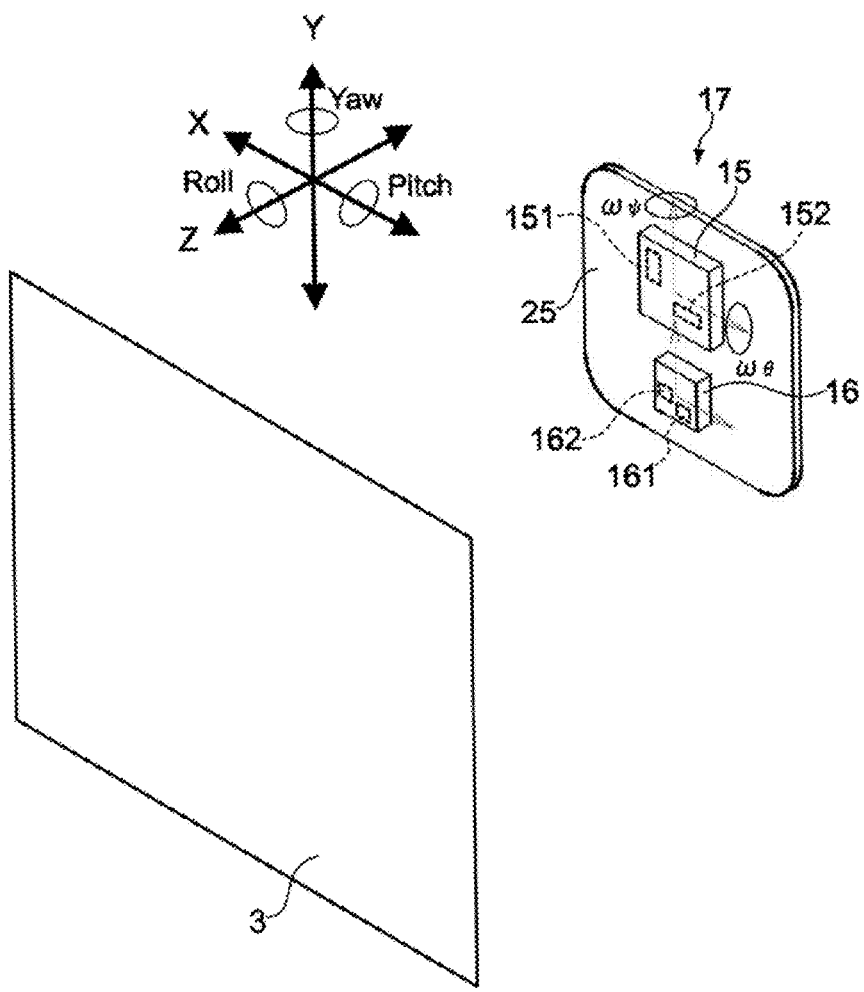
FIG. 8 is a perspective diagram showing a sensor unit.

FIG. 8 is a perspective diagram showing the sensor unit 17. The sensor unit 17 is a sensor that detects a movement of the casing 10, that is, a movement of the input apparatus 1. The sensor unit 17 includes an acceleration sensor unit 16 for detecting accelerations in different angles such as along two orthogonal axes (X' axis and Y' axis). Specifically, the acceleration sensor unit 16 includes two sensors, that is, a first acceleration sensor 161 and a second acceleration sensor 162.

The sensor unit 17 further includes an angular velocity sensor unit 15 for detecting angular accelerations about the two orthogonal axes. Specifically, the angular velocity sensor unit 15 includes two sensors, that is, a first angular velocity sensor 151 and a second angular velocity sensor 152. The acceleration sensor unit 16 and the angular velocity sensor unit 15 are packaged and mounted on a circuit board 25.

As each of the first and second angular velocity sensors 151 and 152, a vibration gyro sensor for detecting Coriolis force in proportion to an angular velocity is used. As each of the first and second acceleration sensors 161 and 162, any sensor such as a piezoresistive sensor, a piezoelectric sensor, or a capacitance sensor may be used. The angular velocity sensors 151 and 152 are not limited to the vibration gyro sensor, and a rotary top gyro sensor, a ring laser gyro sensor, a gas rate gyro sensor, and the like may also be used.

In descriptions on FIGS. 2 and 3, a longitudinal direction of the casing 10 is referred to as Z' direction, a thickness direction of the casing 10 is referred to as X' direction, and a width direction of the casing 10 is referred to as Y' direction for convenience. In this case, the sensor unit 17 is incorporated into the casing 10 such that a surface of the circuit board 25 on which the acceleration sensor unit 16 and the angular velocity sensor unit 15 are mounted becomes substantially parallel to an X'-Y' plane. As described above, the sensor units 16 and 15 each detect physical amounts with respect to the two axes, that is, the X' axis and the Y' axis. In the specification, a coordinate system that moves along with the input apparatus 1, that is, a coordinate system fixed to the input apparatus 1 is expressed using the X' axis, Y' axis, and Z' axis, whereas a coordinate system stationary on earth, that is, an inertial coordinate system is expressed using the X axis, Y axis, and Z axis. Further, in descriptions below, with regard to a movement of the input apparatus 1, a rotational direction about the X' axis is sometimes referred to as pitch direction, a rotational direction about the Y' axis is sometimes referred to as yaw direction, and a rotational direction about the Z' axis (roll axis) is sometimes referred to as roll direction.

The control unit 30 includes a main substrate 18, an MPU 19 (Micro Processing Unit) (or CPU) mounted on the main substrate 18, a crystal oscillator 20, a transceiver 21, and an antenna 22 printed on the main substrate 18.

The MPU 19 includes a built-in volatile or nonvolatile memory requisite therefor. The MPU 19 is input with a detection signal from the sensor unit 17, an operation signal from the operation section 23, and the like, and executes various kinds of operational processing in order to generate predetermined control signals (commands) in response to those input signals. The memory may be provided separate from the MPU 19.

Typically, the MPU 19 generates, as the control signals, a movement command corresponding to a detection signal detected by the sensor unit 17 and an operation command corresponding to an operation signal output from the operation section.

Typically, the MPU 19 generates, as the control signals, a movement command corresponding to a detection signal detected by the sensor unit 17 and an operation command corresponding to an operation signal output from the operation section.

Typically, the sensor unit 17 outputs analog signals. In this case, the MPU 19 includes an A/D (Analog/Digital) converter. Alternatively, the sensor unit 17 may be a unit that includes the A/D converter.

The transceiver 21 transmits, as RF radio signals, a control signal generated in the MPU 19 to the control apparatus 40 via the antenna 22.

The crystal oscillator 20 generates clocks and supplies them to the MPU 19. As the batteries 14, dry cell batteries, rechargeable batteries, and the like are used.

The control apparatus 40 is a computer and includes an MPU 35 (or CPU), a display control section 42, a RAM 36, a ROM 37, a video RAM 41, an antenna 39, and a transceiver 38.

The transceiver 38 receives the control signal transmitted from the input apparatus 1 via the antenna 39. The MPU 35 analyzes the control signal and executes various kinds of operational processing. The display control section 42 mainly generates screen data to be displayed on the screen 3 of the display apparatus 5 under control of the MPU 35. The video RAM 41 as a working area of the display control section 42 temporarily stores the generated screen data.

The control apparatus 40 may be an apparatus dedicated to the input apparatus 1, or may be a PC or the like. The control apparatus 40 is not limited to the PC and may be a computer integrally formed with the display apparatus 5, audiovisual equipment, a projector, a game device, a car navigation system, or the like.

Examples of the display apparatus 5 include a liquid crystal display and an EL (Electro-Luminescence) display, but are not limited thereto. The display apparatus 5 may alternatively be an apparatus integrally formed with a display and capable of receiving television broadcasts and the like.

Figure 5:
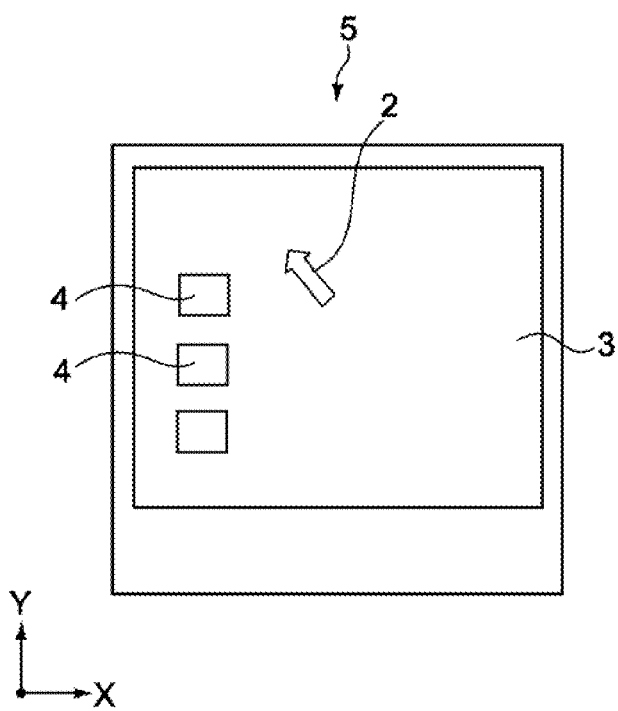
FIG. 5 is a diagram showing an example of a screen displayed on a display apparatus.

FIG. 5 is a diagram showing an example of the screen 3 displayed on the display apparatus 5. Icons 4, a pointer 2, and the like are displayed on the screen 3. It should be noted that on the screen 3, the horizontal direction is referred to as X-axis direction and the vertical direction is referred to as Y-axis direction.

Figure 6:
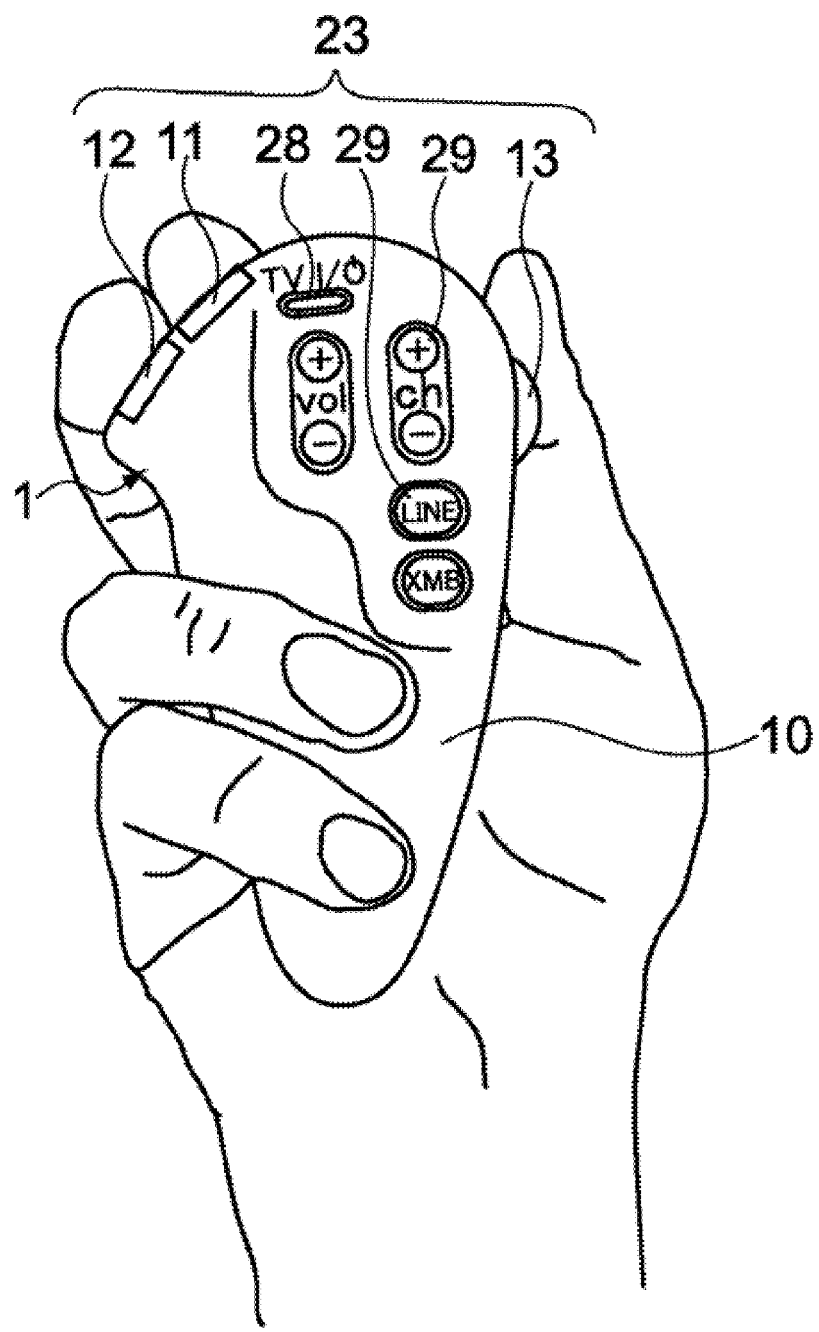
FIG. 6 is a diagram showing a state where a user is holding the input apparatus.

FIG. 6 is a diagram showing a state where a user is holding the input apparatus 1. As shown in FIG. 6, the input apparatus 1 may include, as the operation section 23, in addition to the buttons 11, 12, and 13, various operation buttons 29 such as those provided to a remote controller for operating a television or the like and a power supply switch 28, for example. When the user moves the input apparatus 1 in the air or operates the operation section 23 while holding the input apparatus 1 as shown in the figure, a control signal is generated and output to the control apparatus 40, and the control apparatus 40 controls the pointer.

Next, a description will be given on typical examples of ways of moving the input apparatus 1 and ways the pointer 2 moves on the screen 3 accordingly. FIG. 7 are explanatory diagrams therefor.

Figure 7A:
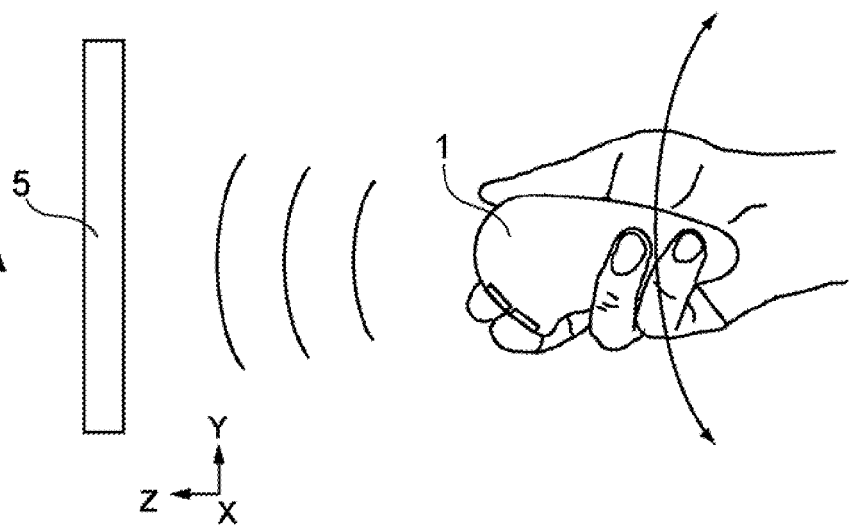
FIG. 7 are diagrams for illustrating typical examples of ways of moving the input apparatus and ways a pointer moves on the screen accordingly.
Figure 7B:
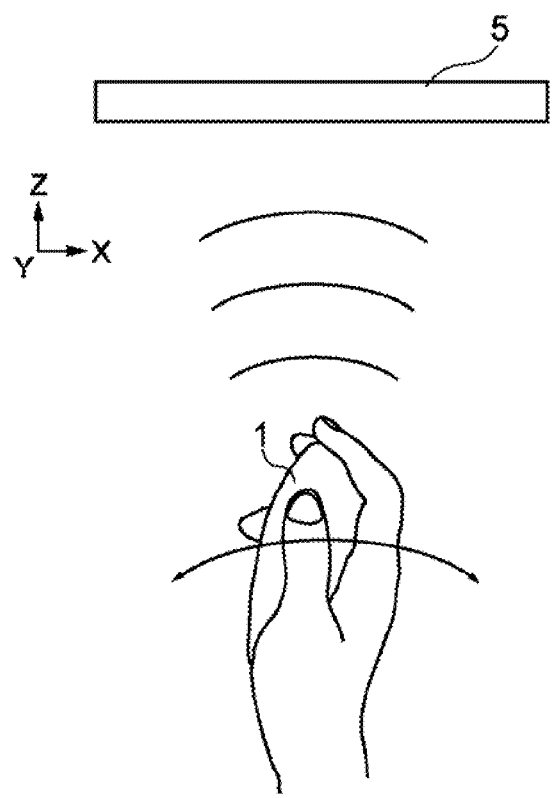

As shown in FIGS. 7A and 7B, the user holds the input apparatus 1 so as to aim the buttons 11 and 12 side of the input apparatus 1 at the display apparatus 5 side. The user holds the input apparatus 1 so that a thumb is located on an upper side and a pinky is located on a lower side as in handshakes. In this state, the circuit board 25 of the sensor unit 17 (see FIG. 8) is close to being in parallel with the screen 3 of the display apparatus 5, and the two axes as detection axes of the sensor unit 17 respectively correspond to the horizontal axis (X axis) and the vertical axis (Y axis) on the screen 3. Hereinafter, the position of the input apparatus 1 as shown in FIGS. 7A and 7B will be referred to as reference position.

As shown in FIG. 7A, in the reference position, the user swings a wrist or an arm in the vertical direction, that is, the pitch direction. At this time, the second acceleration sensor 162 detects an acceleration ay in the Y'-axis direction, and the second angular velocity sensor 152 detects an angular velocity coo about the X' axis. Based on those physical amounts, the control apparatus 40 controls display of the pointer 2 so that the pointer 2 moves in the Y-axis direction.

Meanwhile, as shown in FIG. 7B, in the reference position, the user swings the wrist or the arm in the lateral direction, that is, the yaw direction. At this time, the first acceleration sensor 161 detects an acceleration ax in the X'-axis direction, and the first angular velocity sensor 151 detects an angular velocity $\omega_\theta$ about the Y' axis. Based on the physical amounts thus detected, the control apparatus 40 controls display of the pointer 2 so that the pointer 2 moves in the X-axis direction.

Figure 9:
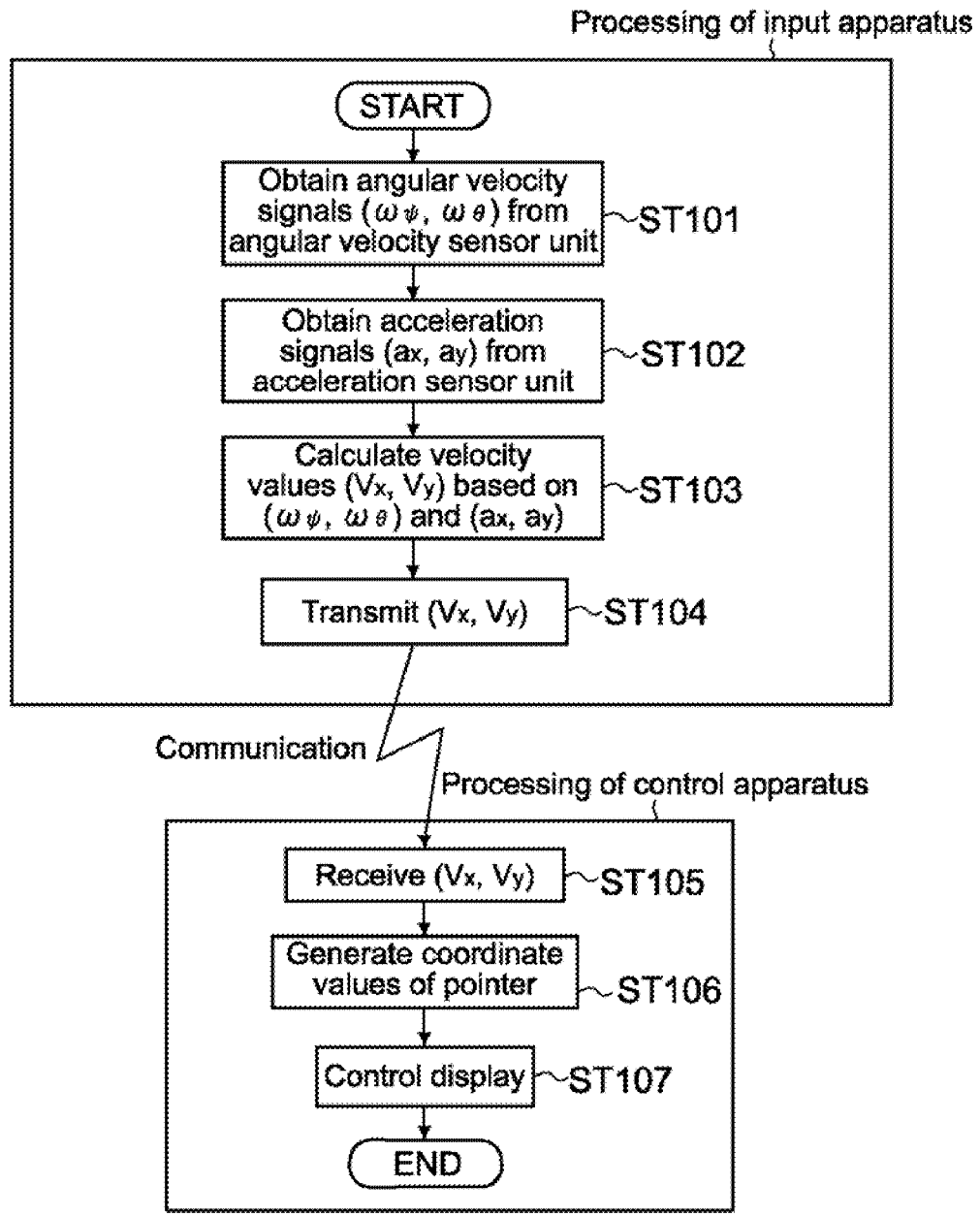
FIG. 9 is a flowchart showing an operation of the control system.

Next, an operation of the control system 100 structured as described above will be described. FIG. 9 is a flowchart showing the operation.

As shown in FIG. 9, when the user presses the power supply switch 28 and the power of the input apparatus 1 is thus turned on, for example, biaxial angular velocity signals are output from the angular velocity sensor unit. First and second angular velocity values ($\omega_\psi$, $\omega_\theta$) obtained from the angular velocity signals are input to the MPU 19 (Step 101).

Further, upon turning on the power of the input apparatus 1, biaxial acceleration signals are output from the acceleration sensor unit 16, and first and second acceleration values ($a_x$, $a_y$) obtained from the biaxial acceleration signals are input to the MPU 19 (Step 102). The signals on the acceleration values are signals corresponding to the position of the input apparatus 1 at a point when the power is turned on (hereinafter, referred to as initial position). Hereinafter, the initial position will be described as being the reference position. It should be noted that the MPU 19 typically carries out Steps 101 and 102 in sync every predetermined clock cycle.

Based on the acceleration values ($a_x$, $a_y$) and the angular velocity values ($\omega_\psi$, $\omega_\theta$), the MPU 19 calculates velocity values (first velocity value $V_x$, second velocity value $V_y$) by a predetermined operation (Step 103). The first velocity value $V_x$ is a velocity value in a direction along the X' axis, and the second velocity value $V_y$ is a velocity value in a direction along the Y' axis. A calculation method of the velocity values will be described later in detail.

As described above, in this embodiment, instead of calculating the velocity values ($V_x$, $V_y$) by simply integrating the acceleration values ($a_x$, $a_y$), the velocity values ($V_x$, $V_y$) are calculated based on the acceleration values ($a_x$, $a_y$) and the angular velocity values ($\omega_\psi$, $\omega_\theta$). Accordingly, as described above, an operational feeling of the input apparatus 1 that matches an intuition of the user can be obtained, and moreover, the movement of the pointer 2 on the screen 3 also accurately matches the movement of the input apparatus 1. However, the velocity values ($V_x$, $V_y$) do not always need to be calculated based on the acceleration values ($a_x$, $a_y$) and the angular velocity values ($\omega_\psi$, $\omega_\theta$) and may be calculated by simply integrating the acceleration values ($a_x$, $a_y$).

The MPU 19 transmits information on the calculated velocity values ($V_x$, $V_y$) to the control apparatus 40 via the transceiver 21 and the antenna 22 (Step 104).

The MPU 35 of the control apparatus 40 receives the information on the velocity values ($V_x$, $V_y$) via the antenna 39 and the transceiver 38 (Step 105). In this case, the input apparatus 1 transmits the velocity values ($V_x$, $V_y$) every predetermined number of clocks, that is, per predetermined unit time, and the control apparatus 40 receives the velocity values every predetermined number of clocks.

Upon receiving the information on the velocity values, the MPU 35 of the control apparatus 40 generates coordinate values of the pointer 2 based on the received velocity values. The display control section 42 controls display of the screen 3 so that the pointer 2 is displayed at the generated coordinate values.

Next, a description will be given on a relationship among a cycle in which the input apparatus 1 calculates the velocity values (hereinafter, referred to as calculation cycle), a cycle in which the input apparatus 1 transmits information on the velocity values (hereinafter, referred to as transmission cycle), a cycle in which the control apparatus 40 receives the information on the velocity values (hereafter, referred to as reception cycle), and a cycle in which the control apparatus 40 plots the movement of the pointer 2 (hereinafter, referred to as plotting cycle).

Figure 10A:
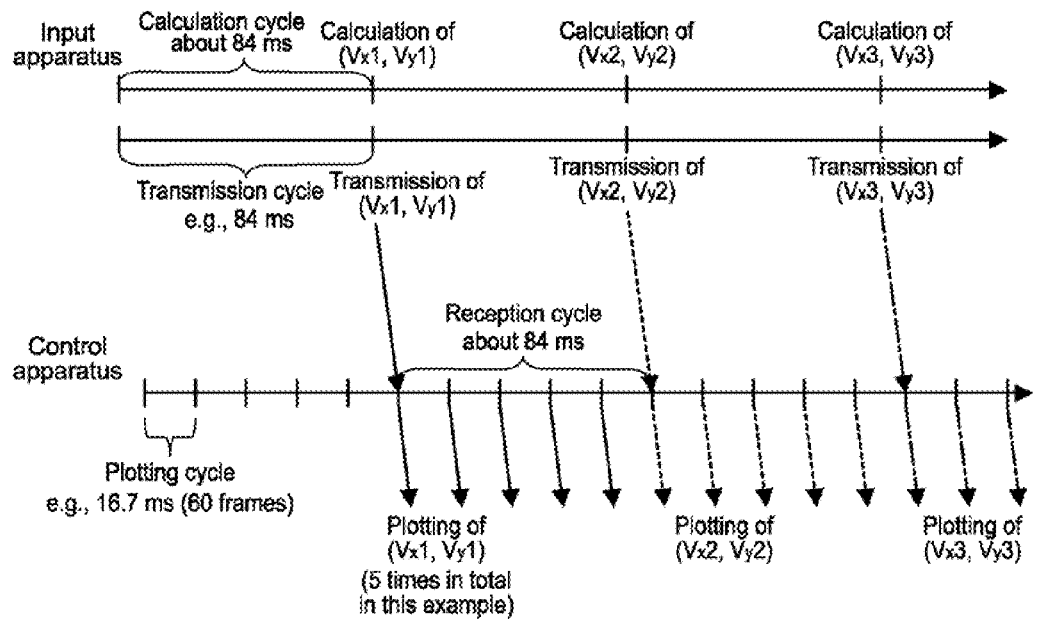
FIG. 10A is a timing chart showing a relationship among a calculation cycle, a transmission cycle, and a plotting cycle.
Figure 10B:
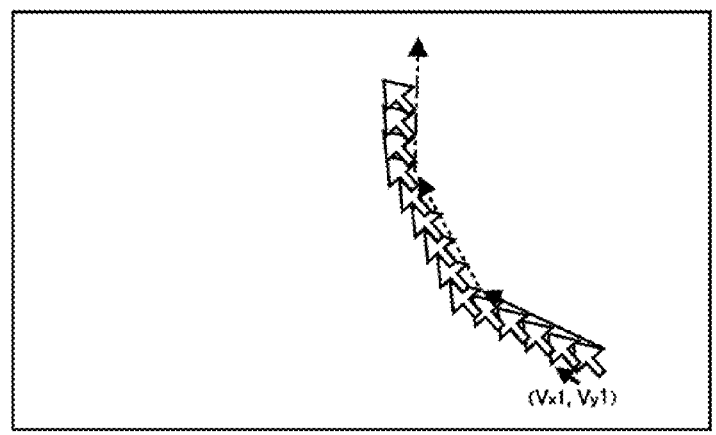
FIG. 10B is a diagram showing the pointer moving on the screen.

FIG. 10A is a timing chart showing the relationship among the cycles, and FIG. 10B is a diagram showing the pointer 2 moving on the screen 3.

As shown in FIG. 10A, the input apparatus 1 of this embodiment calculates velocity values in a calculation cycle of about 84 ms, for example. The calculation cycle is a cycle in which the MPU 19 calculates, since having obtained the signals ($\omega_\psi$, $\omega_\theta$), ($a_x$, $a_y$)) from the angular velocity sensors and the acceleration sensors, the velocity values ($V_x$, $V_y$) based on the obtained signals (see FIG. 9, Steps 101 to 103). The MPU 19 transmits information on the calculated velocity values in a transmission cycle of, for example, 84 ms (see Step 104).

The control apparatus receives the information on the velocity values in a reception cycle of 84 ms (see Step 105). Upon receiving the information on the velocity values, the MPU 35 of the control apparatus 40 generates coordinate values (X(t), Y(t)) of the pointer 2 in a cycle that is 1/5 the length of the transmission cycle (16.7 ms) (see Step 106). The display control section 42 controls display so that the pointer 2 moves on the screen 3 in the cycle of 16.7 ms (see Step 107).

On the screen 3, the pointer 2 moves as shown in FIG. 10B.

Next, a typical operation of the control system 100 will be described.

Figure 11A:
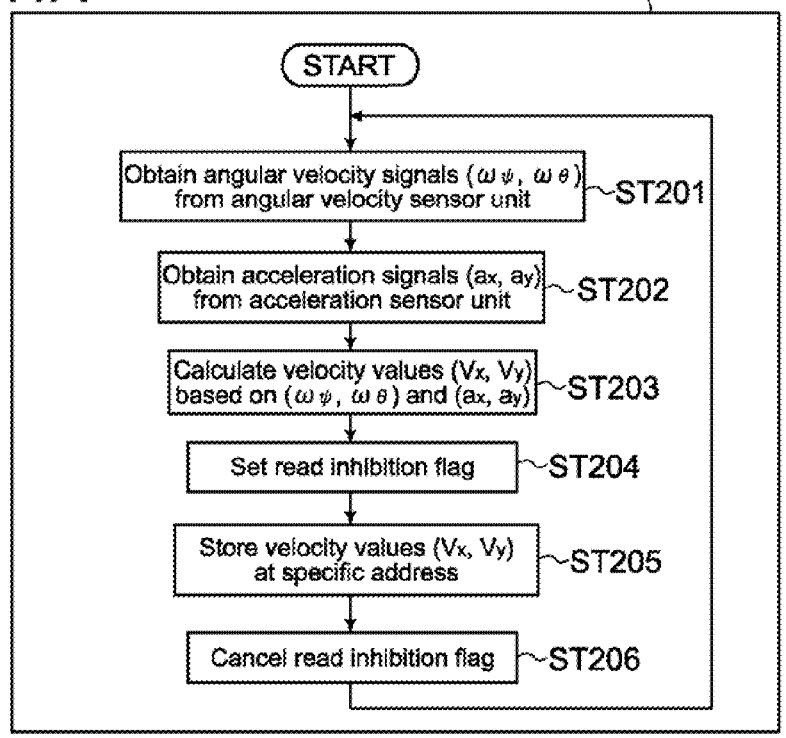
FIG. 11 are diagrams showing processing of the input apparatus.
Figure 11B:
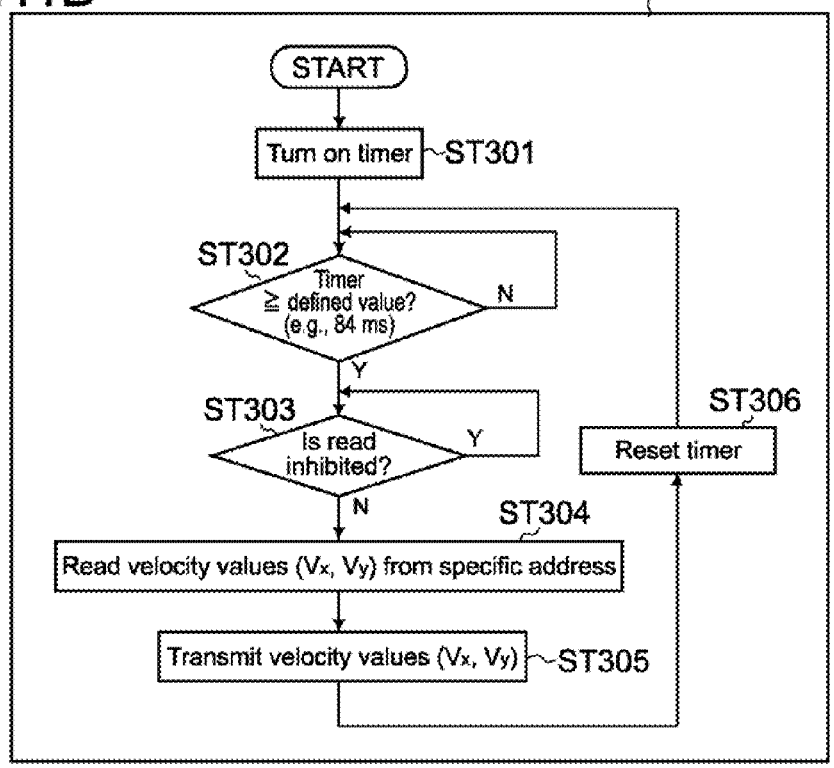
Figure 12:
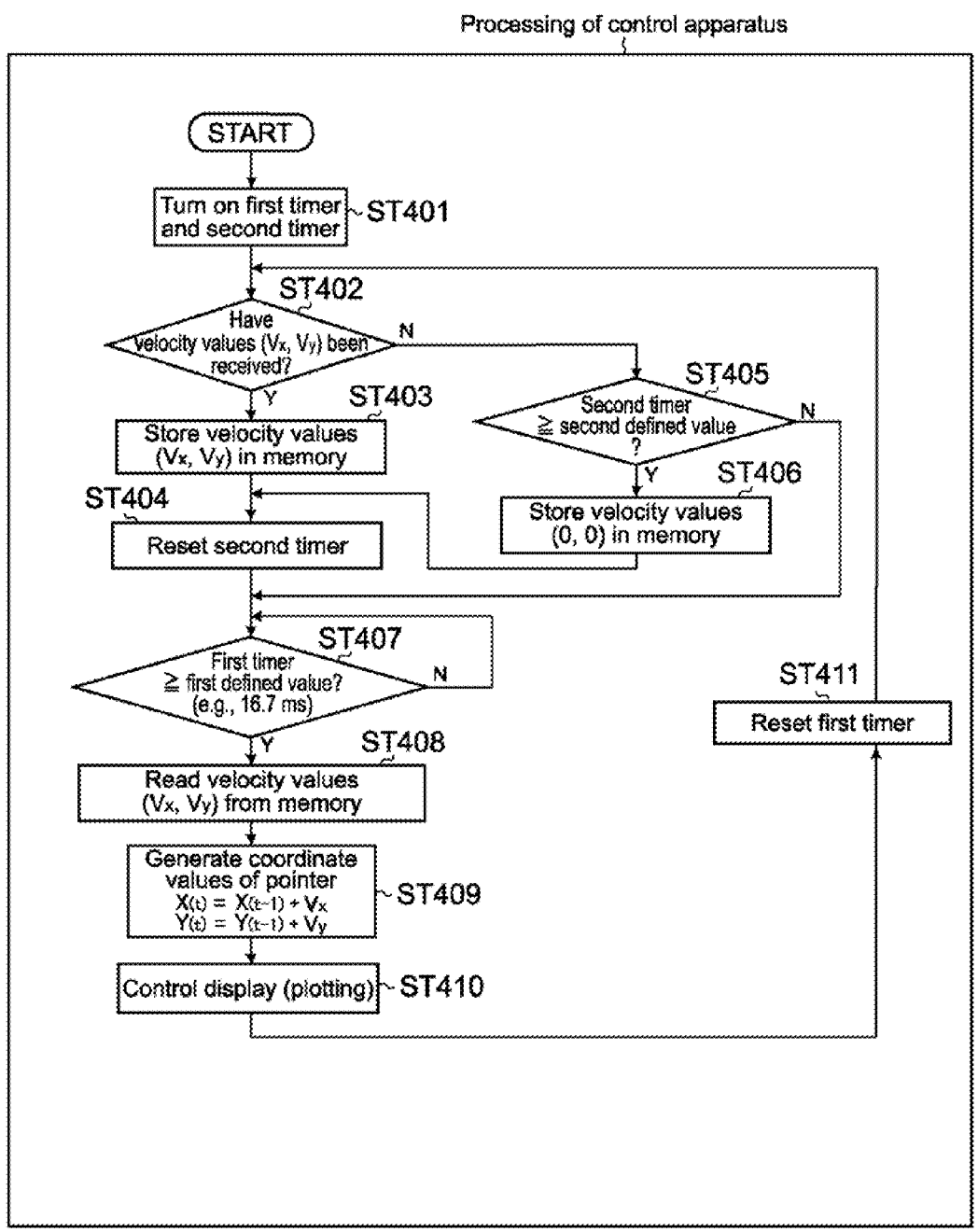
FIG. 12 is a diagram showing processing of a control apparatus.

FIGS. 11 and 12 are flowcharts showing the operation of the control system 100. FIG. 11 are diagrams showing processing of the input apparatus 1, and FIG. 12 is a diagram showing processing of the control apparatus 40.

First, the processing of the input apparatus 1 will be described. FIG. 11A is a flowchart showing an operation of the input apparatus 1 for calculating velocity values, and FIG. 11B is a flowchart showing an operation of the input apparatus 1 for transmitting information on the velocity values. The processing shown in FIGS. 11A and 11B are executed in parallel each as independent processing.

As shown in FIG. 11A, the MPU 19 of the input apparatus 1 obtains signals ($\omega_\psi$, $\omega_\theta$), ($a_x$, $a_y$)) from the angular velocity sensor unit 15 and the acceleration sensor unit 16 and calculates velocity values ($V_x$, $V_y$) based on the obtained signals (Steps 201 to 203). Upon calculating the velocity values, the MPU 19 sets a read inhibition flag (Step 204) and stores the velocity values at a specific address in a memory (Step 205). The memory may be a built-in volatile memory of the MPU 19 or a dedicated memory. Upon storing the velocity values in the memory, the MPU 19 cancels the read inhibition flag (Step 206) and returns to Step 201.

By the loop of Steps 201 to 206, the velocity values are calculated and stored in the memory in a predetermined cycle (about 84 ms). It should be noted that since the calculation of Step 203 is a complex process as will be described later (see FIGS. 23 and 25), the calculation cycle may fluctuate more or less.

The MPU 19 executes the processing shown in FIG. 11B in parallel with the processing shown in FIG. 11A. For example, when the user presses the power supply switch 28 and the power of the input apparatus 1 is thus turned on, the MPU 19 turns on a timer (Step 301) and starts counting the transmission cycle.

Upon turning on the timer, the MPU 19 judges whether the timer is equal to or larger than a defined value (Step 302). The defined value is, for example, a value corresponding to a time of 84 ms. When the timer is equal to or larger than the defined value, that is, when the time of 84 ms has elapsed since having turned on or reset the timer (see Step 306), the MPU 19 judges whether read of the velocity values is inhibited by the read inhibition flag (Step 303). When the read of the velocity values is not inhibited, the MPU 19 reads the velocity values from a specific address in the memory (Step 304) and transmits the read velocity values to the control apparatus 40 via the antenna (Step 305).

Upon transmitting the information on the velocity values, the MPU 19 resets the timer (Step 306) and transmits information on the velocity values again after an elapse of 84 ms since the timer reset (Steps 302 to 305). By the loop of Steps 302 to 306, information on the velocity values is transmitted from the input apparatus 1 in a regular transmission cycle of 84 ms. In other words, although the cycle of 84 ms may fluctuate more or less in the processing shown in FIG. 11A, since a regular cycle of 84 ms can be maintained in the processing shown in FIG. 11B, the input apparatus 1 can transmit the information on the velocity values to the control apparatus 40 in a regular cycle of 84 ms.

It should be noted that when the read of the velocity values is inhibited in Step 303, the regular transmission cycle of 84 ms may become irregular. However, since a time required for the MPU 19 to store the calculated velocity values in the memory (see Steps 204 to 206 of FIG. 11A) is several µs or less, the irregularity hardly causes a problem.

The processing shown in FIGS. 11A and 11B may be executed by a single MPU 19 or two MPUs 19. When the processing is executed by two MPUs 19, SPI (Serial Peripheral Interface) communication is used for obtaining a content of a specific address, for example.

Next, the processing of the control apparatus 40 will be described.

As shown in FIG. 12, when the power of the control apparatus 40 is turned on, the MPU 35 of the control apparatus 40 turns on a first timer and a second timer (Step 401). Here, the first timer is a timer for counting the plotting cycle and the second timer is a timer for counting a time taken to receive information on the next velocity values since having received information on the previous velocity values.

Upon turning on the timer, the MPU 35 judges whether the information on the velocity values transmitted from the input apparatus 1 has been received (Step 402). Here, since the input apparatus 1 transmits the information on the velocity values in a regular transmission cycle of 84 ms as described above, the control apparatus 40 typically receives the information on the velocity values in a regular reception cycle of 84 ms. When the information on the velocity values from the input apparatus 1 is received (YES in Step 402), the MPU 35 stores the received information on the velocity values in a memory (Step 403). The memory may be a built-in volatile memory of the MPU 35 or a dedicated memory. Upon storing the velocity values in the memory, the MPU 35 resets the second timer (Step 404) and advances to Step 407.

When the information on the velocity values is not received in Step 402 (NO in Step 402), the MPU 35 judges whether the second timer is equal to or larger than a second defined value (Step 405). The second defined value is, for example, a value corresponding to a time of 168 ms, but is not limited thereto. For example, as long as the second defined value is a value corresponding to a time equal to or longer than the transmission cycle, the second defined value may be a value corresponding to a time of 168 ms or less or a value corresponding to a time of 168 ms or more.

When the second timer is equal to or larger than the second defined value (YES in Step 405), the MPU 35 stores the velocity values set to 0 (0, 0) in the memory (Step 406). Upon storing the velocity values (0, 0) in the memory, the MPU 35 resets the second timer (Step 404) and advances to Step 407. When the second timer is smaller than the second defined value (NO in Step 405), the MPU 35 advances to Step 407.

In Step 407, the MPU 35 judges whether the first timer is equal to or larger than a first defined value (Step 407). The first defined value is, for example, a value corresponding to a time of 16.7 ms that is ⅕ the time of the transmission cycle. The first defined value does not need to be a value corresponding to a time of 16.7 ms. For example, the first defined value may be a value corresponding to half the time of the transmission cycle or a value corresponding to 1/10 the time of the transmission cycle. Moreover, the first defined value may be set so as to match with a refresh timing of an image.

When the first timer is equal to or larger than the first defined value, the MPU 35 reads the velocity values from the memory (Step 408). The MPU 35 adds the velocity values read out from the memory to previous coordinate values by Equations (1) and (2) below to generate new coordinate values (X(t), Y(t)) (Step 409).

$$X(t)=X(t-1)+V_x \qquad (1)$$

$$Y(t)=Y(t-1)+V_y \qquad (2)$$

When the coordinate values are generated, the display control section 42 controls display of the screen 3 so that the pointer 2 is displayed at a position corresponding to the generated coordinate values (Step 410). Upon control of the display of the screen 3, the MPU 35 resets the first timer (Step 411) and again executes the processes of Step 402 and subsequent steps.

By the processing shown in FIG. 12, the movement of the pointer 2 is displayed in a plotting cycle of 16.7 ms based on the velocity values stored in the memory during a period from a time when the information on the velocity values from the input apparatus 1 is received to a time when information on the next velocity values is received. Typically, the MPU 35 generates new coordinate values 5 times using the same velocity values in the cycle of 16.7 ms, and the display control section 42 controls display of the screen 3 so that the pointer 2 is displayed at a position corresponding to the generated coordinate values. Specifically, while the reception cycle in which the information on the velocity values is received from the input apparatus 1 is 84 ms, the control apparatus 40 can display the movement of the pointer 2 in a plotting cycle of 16.7 ms. Accordingly, the pointer can be moved smoothly on the screen 3 even when the reception cycle becomes long (see FIG. 10B).

It should be noted that when the second timer is equal to or larger than the second defined value in Step 405, that is, when a time taken to receive information on the next velocity values since having received information on the previous velocity values is equal to or larger than the second defined value (e.g., 168 ms), the velocity values set to 0 (0, 0) are stored in the memory. Therefore, when a time equal to or longer than a predetermined time has elapsed since having received the previous velocity values, the velocity values (0, 0) are read out in Step 408. Thus, the movement of the pointer can be restricted when a predetermined time has elapsed since the reception of the information on the velocity values. Accordingly, it is possible to prevent idle running of the pointer 2 due to the control apparatus 40 continuing to move, despite the fact that the input apparatus 1 has not transmitted the information on the velocity values, the pointer 2 in accordance with the velocity values stored in the memory.

In the descriptions on FIGS. 10, 11, and 12, the calculation cycle has been about 84 ms, the transmission and reception cycles have been 84 ms, and the plotting cycle has been 16.7 ms. However, those cycles may of course take other values. The same holds true for embodiments to be described later.

FIGS. 13 and 14 are diagrams showing comparative examples.

FIG. 13 are diagrams showing an example of a case where the calculation cycle, the transmission cycle, the reception cycle, and the plotting cycle are 84 ms.

Figure 13A:
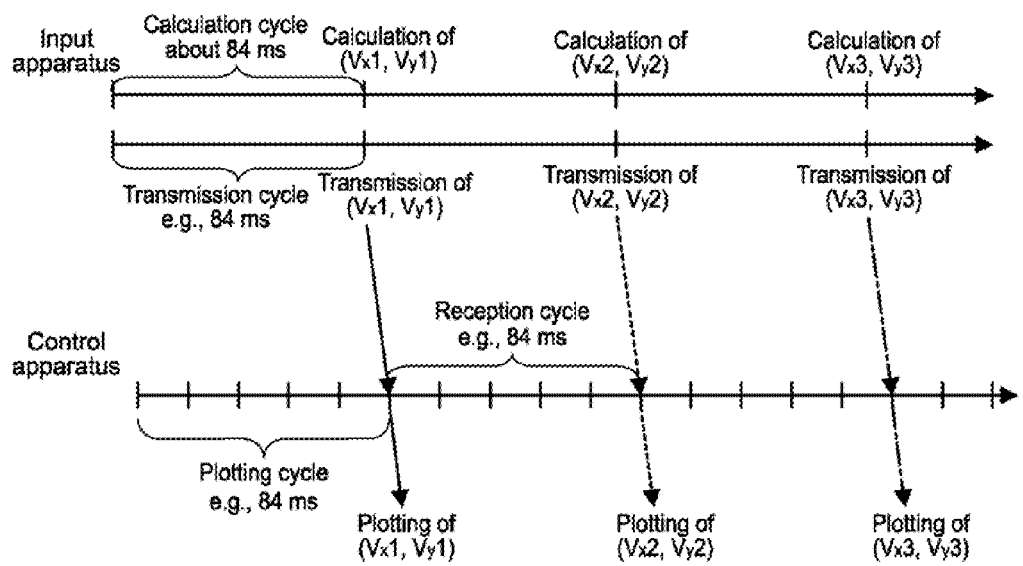
FIG. 13 are diagrams showing a comparative example.

As shown in FIG. 13A, the input apparatus 1 calculates the velocity values in a calculation cycle of 84 ms and transmits the velocity values in a transmission cycle of 84 ms. The control apparatus 40 receives information on the velocity values in a reception cycle of 84 ms and controls display of the movement of the pointer in a plotting cycle of 84 ms.

Figure 13B:
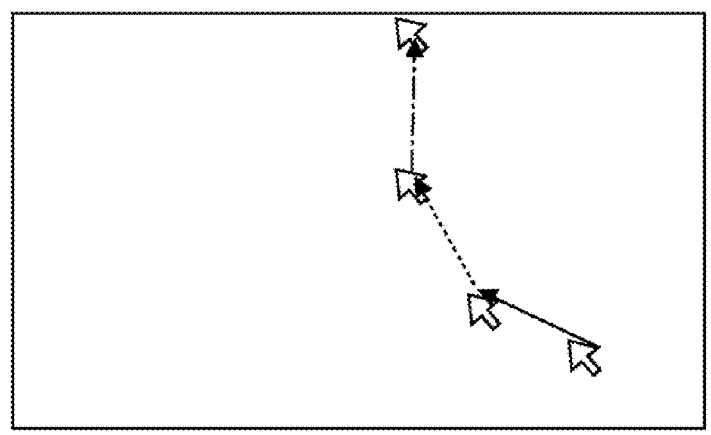

As shown in FIG. 13B, when the pointer 2 is plotted in a cycle of 84 ms, there is no sense of continuity and an operational feeling is poor. On the other hand, according to the processing shown in FIGS. 11 and 12, the movement of the pointer 2 can be displayed continuously as shown in FIG. 10B, and the user can thus smoothly move the pointer 2.

FIG. 14 are diagrams showing an example of a case where the calculation cycle, the transmission cycle, the reception cycle, and the plotting cycle are 16 ms.

Figure 14A:
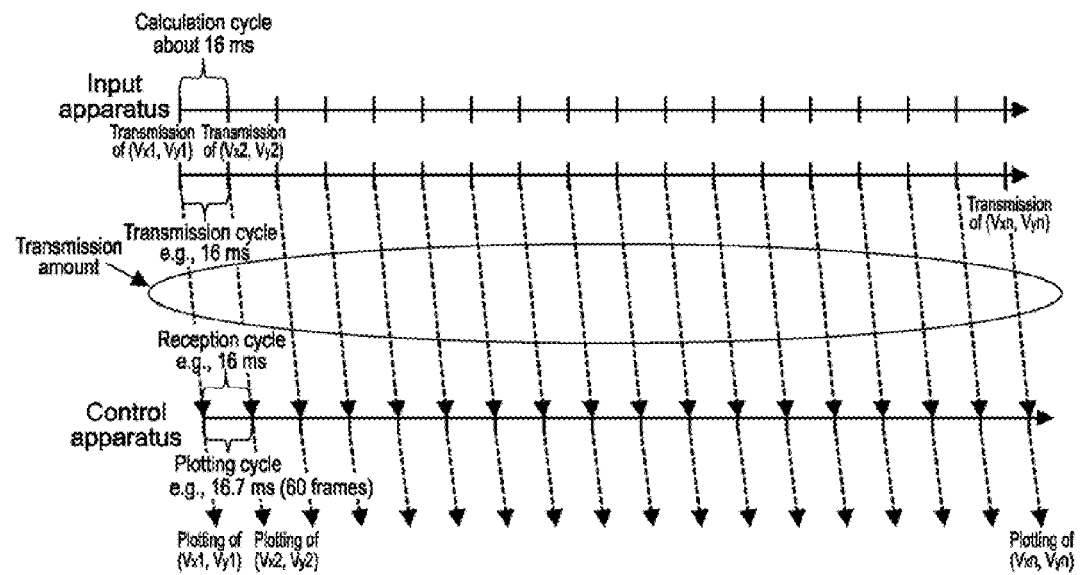
FIG. 14 are diagrams showing a comparative example.

As shown in FIG. 14A, the input apparatus 1 calculates the velocity values in a calculation cycle of 16 ms and transmits information on the velocity values in a transmission cycle of 16 ms. The control apparatus 40 receives the information on the velocity values in a reception cycle of 16 ms and controls display of the movement of the pointer 2 in a plotting cycle of 16 ms.

Figure 14B:
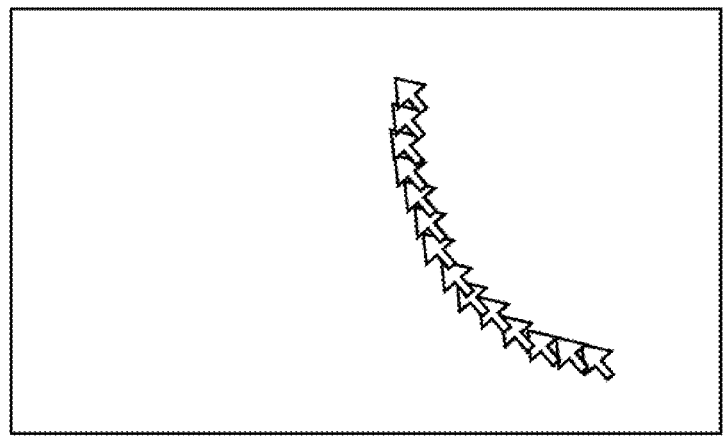

When the calculation cycle, the transmission cycle, and the plotting cycle are set to 16 ms as shown in FIG. 14B, the movement of the pointer 2 can be made smooth. However, since an MPU capable of performing high-speed processing needs to be used when the calculation cycle is set to 16 ms, costs increase. Moreover, because a transmission amount from the input apparatus 1 increases when the transmission cycle becomes short, power consumption of the input apparatus 1 becomes large. Particularly because power consumption in wireless communication is large, an increase in the transmission amount leads to shortening of life of batteries.

On the other hand, according to the processing shown in FIGS. 11 and 12, the pointer 2 can be moved smoothly as shown in FIG. 10 while realizing a reduction of the transmission amount. Therefore, the pointer 2 can be moved smoothly while appropriately reducing power consumption. In addition, since an inexpensive MPU 19 can be used for the input apparatus 1, costs can be cut.

Next, another embodiment of an operation of the control system 100 will be described.

As described above, due to a use of wireless communication of the input apparatus 1, there is a problem that power consumption is large. Here, in a case where the velocity values calculated by the input apparatus 1 are 0, the pointer 2 does not move on the screen 3 even when the velocity values are transmitted. Therefore, necessity of transmitting information on the velocity values is low. In this regard, the input apparatus 1 of this embodiment restricts transmission of information on velocity values from the input apparatus 1 when the calculated velocity values are 0 (0, 0).

Figure 15A:
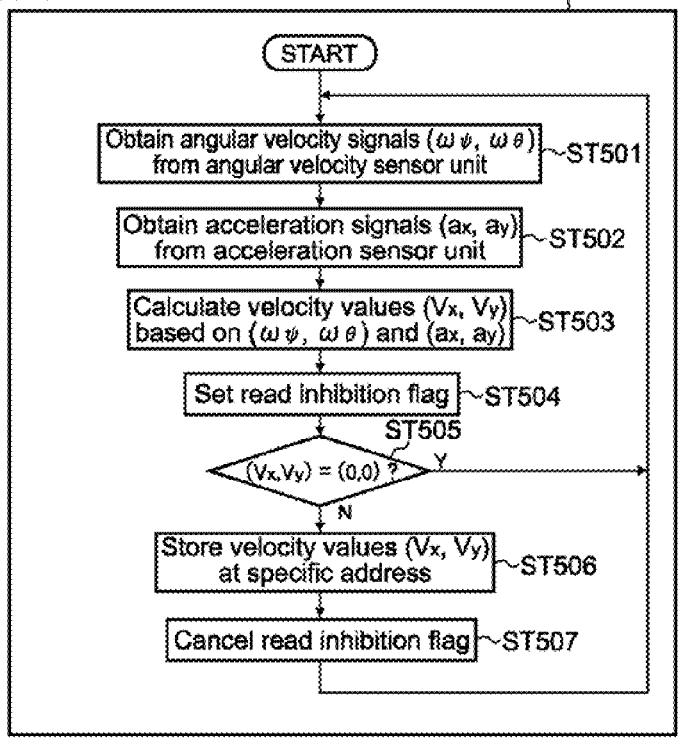
FIG. 15 are diagrams showing operations of the input apparatus in the control system according to another embodiment.
Figure 15B:
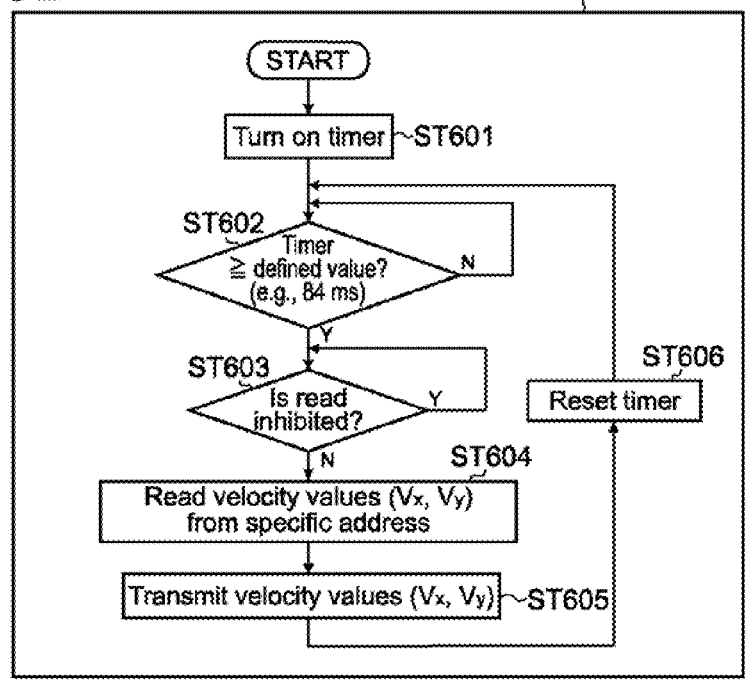

FIG. 15 are diagrams showing operations of the input apparatus 1 in the control system 100 according to this embodiment. FIG. 15A is a flowchart showing an operation of the input apparatus 1 for calculating velocity values, and FIG. 15B is a flowchart showing an operation of the input apparatus 1 for transmitting information on the velocity values. Since the flowchart of FIG. 15B is the same as that of FIG. 11B, a description will mainly be given on FIG. 15A. It should be noted that processing the same as that of the flowchart shown in FIG. 12 is executed as the processing of the control apparatus 40.

As shown in FIG. 15A, the MPU 19 obtains signals of angular velocity values and acceleration values from the sensor unit 17 and calculates velocity values based on the signals of the angular velocity values and acceleration values (Steps 501 to 503). Upon calculating the velocity values, the MPU 19 sets a read inhibition flag (Step 504) and judges whether the calculated velocity values are 0 (0, 0) (Step 505). When the velocity values are not 0 (NO in Step 505), the MPU 19 stores the velocity values at a specific address in the memory (Step 506) and cancels the read inhibition flag (Step 507).

On the other hand, when the calculated velocity values are 0 (YES in Step 505), the MPU 19 returns to Step 501 and obtains angular velocity values and acceleration values to thus calculate velocity values. For example, in a case where the input apparatus 1 is placed on a table and is hardly moved or in a case where the user is hardly moving the input apparatus 1, the velocity values calculated by the input apparatus 1 become 0 or values close to 0. Therefore, since the loop of Steps 501 to 505 is repeated when the input apparatus 1 is hardly moved, a state where the read inhibition flag is not canceled is maintained (see Step 507).

As shown in FIG. 15B, in the processing of transmitting the velocity values, information on the velocity values is not transmitted (see Step 605) when the read inhibition flag is set (YES in Step 603).

In other words, by the processing shown in FIGS. 15A and 15B, the transmission of information on the velocity values from the input apparatus 1 is restricted when the input apparatus 1 is hardly moved and the velocity values are thus 0. Accordingly, because the transmission is restricted when the necessity of transmitting information on the velocity values is low, power consumption of the input apparatus 1 can be reduced appropriately.

It should be noted that because the velocity values (0, 0) are stored in the memory when a predetermined time has elapsed since the information on the velocity values has been received as described above, the control apparatus 40 can prevent idle running of the pointer 2 (see FIG. 12).

FIG. 15 have shown the case where a state where the read inhibition flag is not canceled is maintained when the velocity values are 0 (0, 0). However, the present invention is not limited thereto, and the transmission of the information on the velocity values may be restricted when the velocity values are values close to 0. In this case, it is only necessary to make a judgment on whether the velocity values ($V_x$, $V_y$) are equal to or smaller than a predetermined threshold value in Step 505 of FIG. 15A. The predetermined threshold value is set to a value close to 0. Moreover, the velocity values used for the judgment are typically absolute values.

Incidentally, the control signal transmitted from the input apparatus 1 includes an operation command generated when the operation section 23 is operated in addition to a movement command (signal containing information on velocity values). Therefore, it is possible that, when the press of the button 11 is released and an operation command is thus generated, for example, the control signal be transmitted even when the velocity values are 0. Also in processing shown in FIG. 16 to be described later, it is possible to execute the processing of transmitting a control signal even when the velocity values are 0 upon generation of an operation command.

Next, another embodiment of the control system 100 will be described.

The description on FIG. 15 has been given on the case where transmission of information on the velocity values is restricted by judging whether the velocity values are 0 and maintaining a state where the read inhibition flag is not canceled in the processing of calculating velocity values. On the other hand, in this embodiment, the transmission of information on the velocity values is restricted by judging whether the velocity values are 0 in the processing of transmitting velocity values.

Figure 16A:
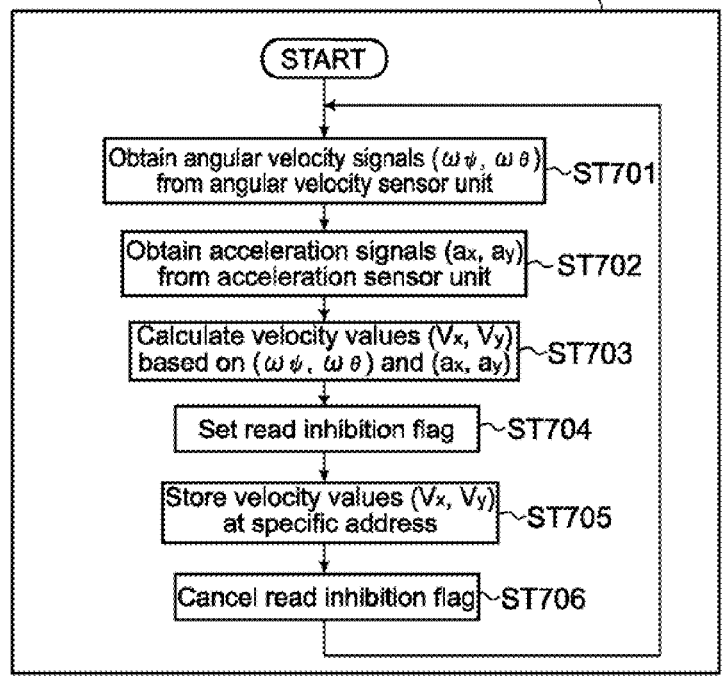
FIG. 16 are diagrams showing operations of the input apparatus in the control system according to another embodiment.
Figure 16B:
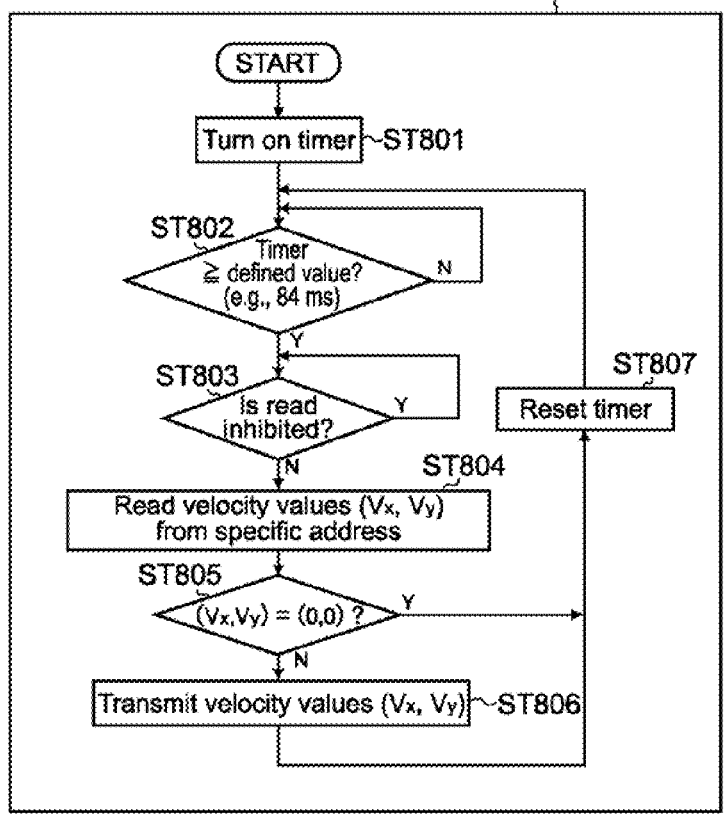

FIG. 16 are flowcharts showing operations of the input apparatus 1 in the control system 100 according to this embodiment. Since the processing of FIG. 16A is the same as that shown in FIG. 11A described above, the processing shown in FIG. 16B will mainly be described. It should be noted that processing of the control apparatus 40 is the same as that shown in FIG. 12.

As shown in FIG. 16B, upon turning on a timer (Step 801), the MPU 19 judges whether the timer is equal to or larger than a defined value (e.g., 84 ms) (Step 802). When the timer is equal to or larger than the defined value, the MPU 19 judges whether read is inhibited (Step 803), and when read is not inhibited, reads the velocity values from the memory (Step 804).

Upon reading the velocity values, the MPU 19 judges whether the read velocity values are 0 (Step 805). It is also possible to judge whether the velocity values ($V_x$, $V_y$) are equal to or smaller than a predetermined threshold value in Step 805. When the velocity values are not 0, the MPU 19 transmits information on the velocity values to the control apparatus 40 via the antenna 22 (Step 806). Then, the MPU 19 resets the timer (Step 807) and repeats the processes of Step 802 and subsequent steps.

On the other hand, when the velocity values are 0 (YES in Step 805), the MPU 19 resets the timer without transmitting the velocity values (Step 807) and repeats the processes of Step 802 and subsequent steps. Accordingly, the transmission of the information on the velocity values is restricted when the input apparatus 1 is hardly moved and the velocity values are thus 0 (0, 0), with the result that power consumption can be reduced appropriately.

Here, the processes in the loop of Step 802, YES in Step 805, and Step 802 and the processes in the loop of Step 802, NO in Step 805, and Step 802 are executed in a regular cycle of 84 ms (see Step 802). Therefore, irrespective of whether the input apparatus 1 is being moved or is hardly moved, the regular cycle of 84 ms can be maintained.

Next, another embodiment of the control system 100 will be described.

Figure 17A:
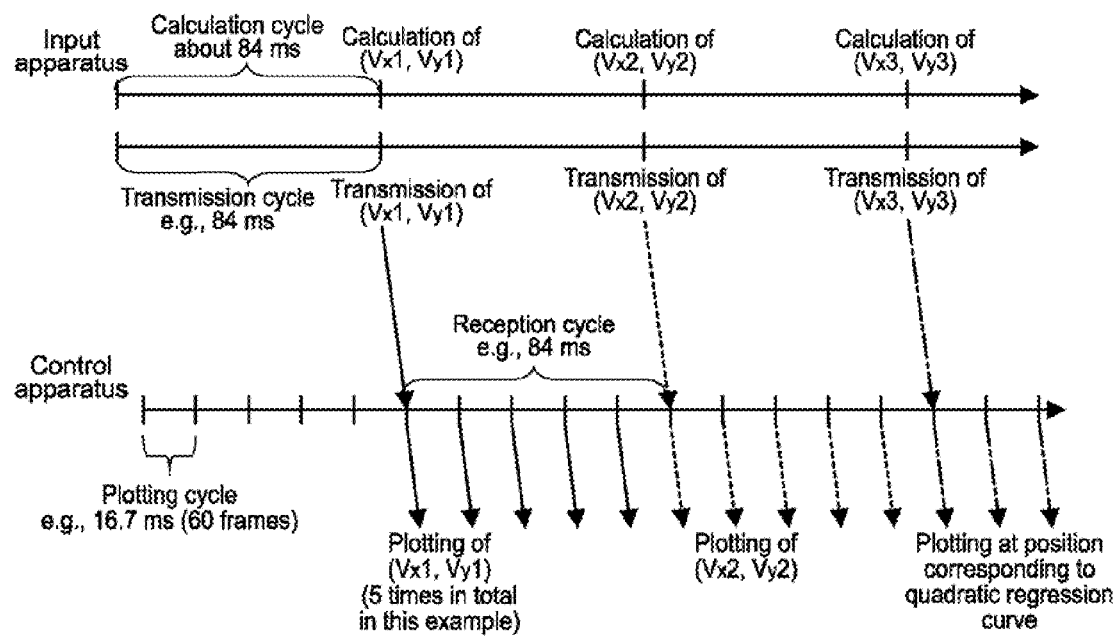
FIG. 17A is a timing chart of the control system according to another embodiment.
Figure 17B:
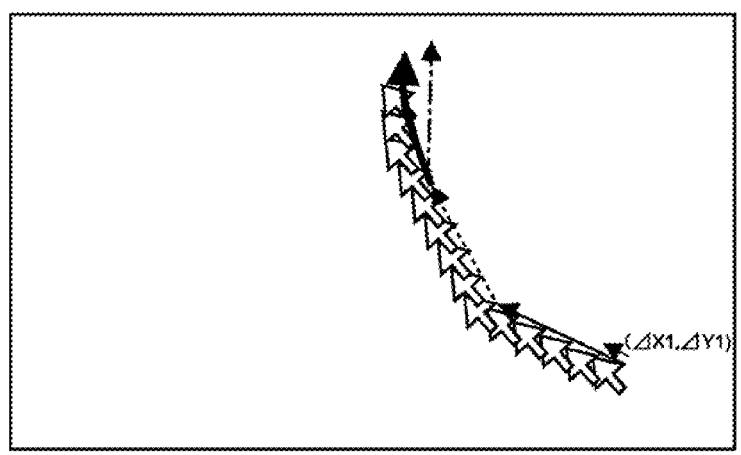
FIG. 17B is a diagram showing the pointer moving on the screen.

FIG. 17A is a timing chart of the control system 100 and FIG. 17B is a diagram showing the pointer 2 moving on the screen 3.

As shown in FIG. 17B, the control apparatus 40 in the control system 100 of this embodiment can move the pointer 2 in a curve on the screen in accordance with information on velocity values transmitted from the input apparatus 1. In this embodiment, a regression curve is used to move the pointer 2 in a curve.

Figure 18:
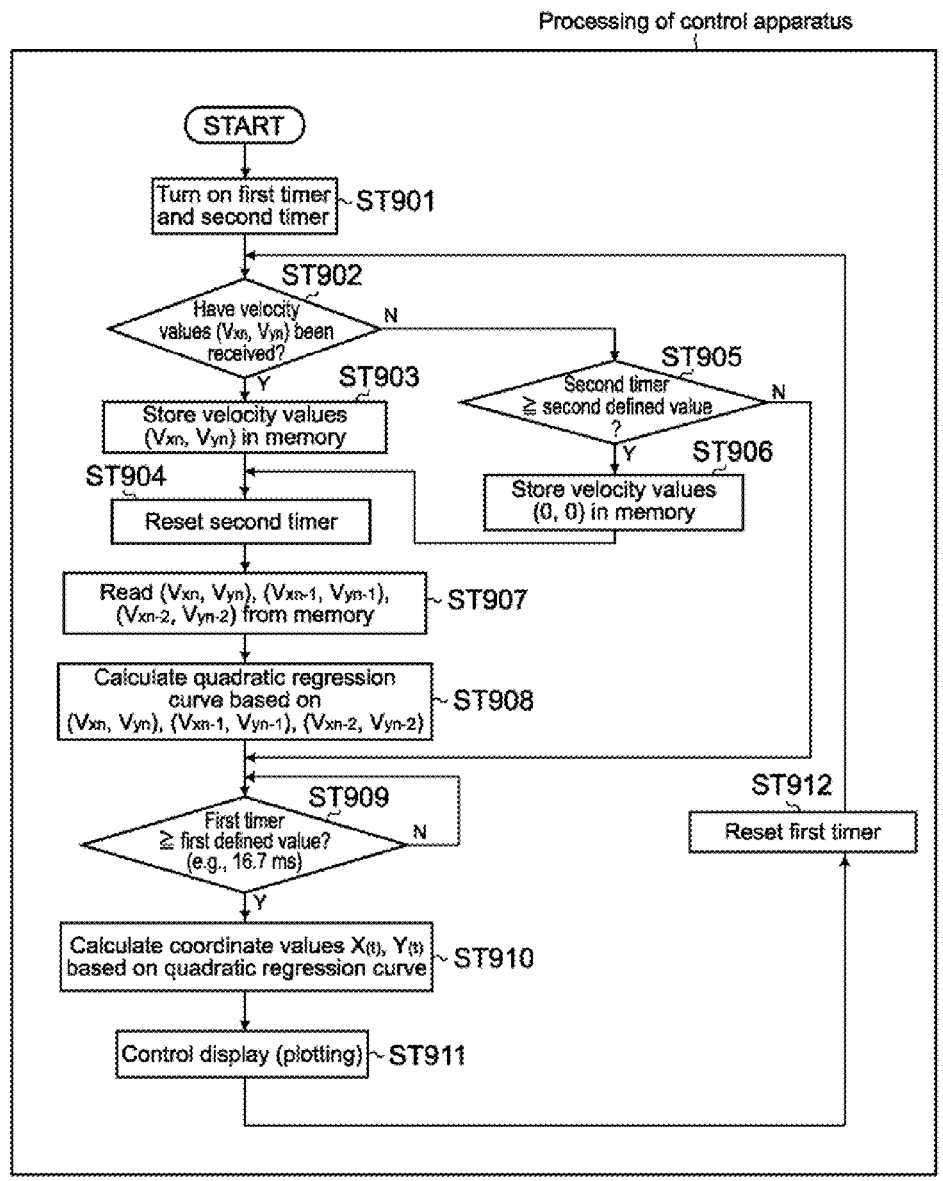
FIG. 18 is a flowchart showing an operation of the control apparatus.

FIG. 18 is a flowchart showing an operation of the control apparatus 40. Points different from those of FIG. 12 will mainly be described in the description on FIG. 18. It should be noted that an operation of the input apparatus 1 is the same as those of the above embodiments.

Upon turning on a first timer and a second timer (Step 901), the MPU 35 judges whether information on velocity values has been received (Step 902). When the information on the velocity values ($V_{xn}$, $V_{yn}$) is received, the MPU 35 stores the received velocity values in the memory (Step 903). It is also possible to delete velocity values ($V_{xn-3}$, $V_{yn-3}$) stored in the memory three cycles before the current velocity values when the current velocity values ($V_{xn}$, $V_{yn}$) are stored in the memory. For realizing such processing, a ring buffer is used, for example.

Next, the MPU 35 resets the second timer (Step 904) and reads the velocity values ($V_{xn}$, $V_{yn}$) currently stored in the memory, velocity values ($V_{xn-1}$, $V_{yn-1}$) previously stored in the memory, and velocity values ($V_{xn-2}$, $V_{yn-2}$) stored in the memory two cycles before the current velocity values from the memory (Step 907). Based on the three sets of read velocity values, the MPU 35 calculates a quadratic regression curve using Equation (3) (Step 908).

$$Y=a_0+a_1X+a_2X^2 \qquad (3)$$

It should be noted that processing the same as that of FIG. 11 described above is executed before the three sets of velocity values are stored in the memory.

Upon calculating the quadratic regression curve, the MPU 35 judges whether the first timer is equal to or larger than a first defined value (Step 909). When the first timer is equal to or larger than the first defined value, that is, when a time of 16.7 ms has elapsed since the reset of the first timer (see Step 912), the MPU 35 calculates coordinate values (X(t), Y(t)) based on the quadratic regression curve (Step 910). Typically, the MPU 35 assigns a time that has elapsed since a reset of the second timer to the quadratic regression curve calculated in Step 908 to calculate the coordinate values (X(t), Y(t)). The display control section 42 controls display of the screen 3 so that the pointer 2 moves on the screen 3 in accordance with the calculated coordinate values (Step 911).

Next, the MPU 35 resets the first timer (Step 912) and repeats the processes of Step 902 and subsequent steps thereafter.

Since the movement of the pointer can be displayed in a curve (FIG. 17B) by the processing shown in FIG. 18, the pointer 2 can be moved more smoothly.

This embodiment has described a case where a quadratic regression curve is used. However, the present invention is not limited thereto, and a regression curve of cubic or more or a multi-degree regression curve may also be used to control display of the movement of the pointer 2. An exponential regression curve may alternatively be used.

Next, another embodiment of an operation of the control system will be described.

The above embodiments have described a case where the calculation cycle and the transmission cycle are the same. In this embodiment, the transmission cycle is shorter than the calculation cycle. Therefore, that point will mainly be described.

Figure 19A:
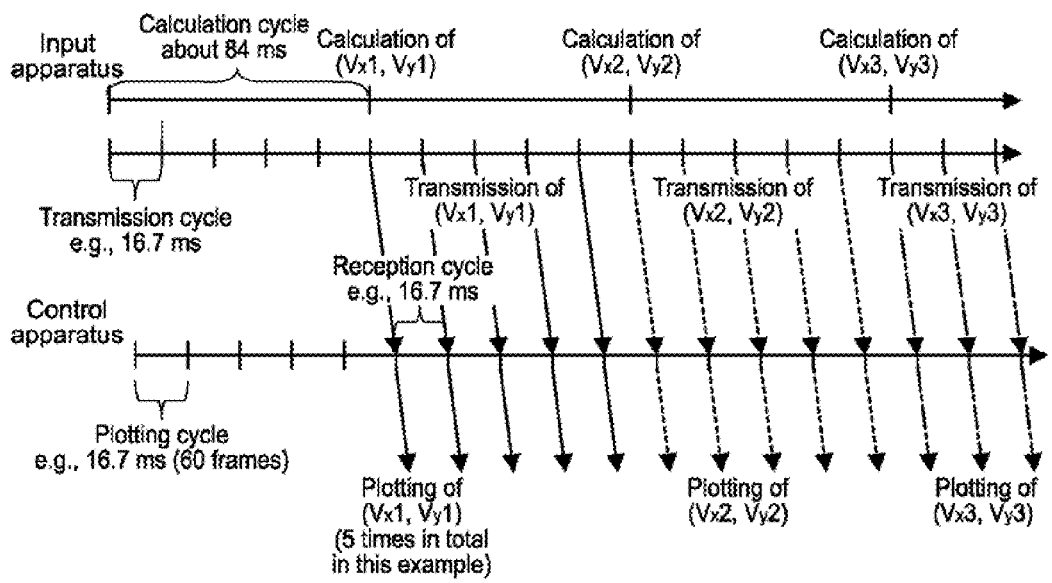
FIG. 19A is a timing chart of the control system according to another embodiment.
Figure 19B:
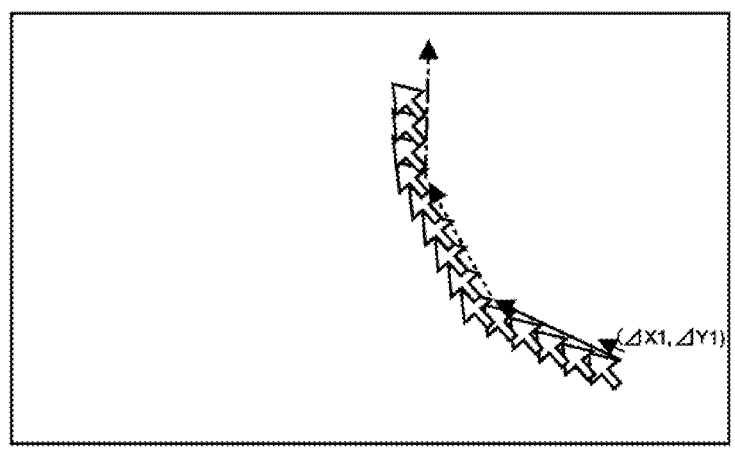
FIG. 19B is a diagram showing the pointer moving on the screen.

FIG. 19A is a timing chart showing a relationship among the calculation cycle, the transmission cycle, the reception cycle, and the plotting cycle, and FIG. 19B is a diagram showing the pointer 2 moving on the screen 3.

As shown in FIG. 19A, the input apparatus 1 calculates velocity values in a cycle of about 84 ms, for example. The input apparatus 1 transmits information on the calculated velocity values in a cycle of 16.7 ms. The control apparatus 40 receives the information on the velocity values in a cycle of 16.7 ms and plots the movement of the pointer 2 in a cycle of, for example, 16.7 ms based on the transmitted information on the velocity values.

On the screen 3, the pointer 2 moves as shown in FIG. 19B.

FIG. 20 are flowcharts showing operations of the input apparatus 1 in the control system 100 according to this embodiment.

Figure 20A:
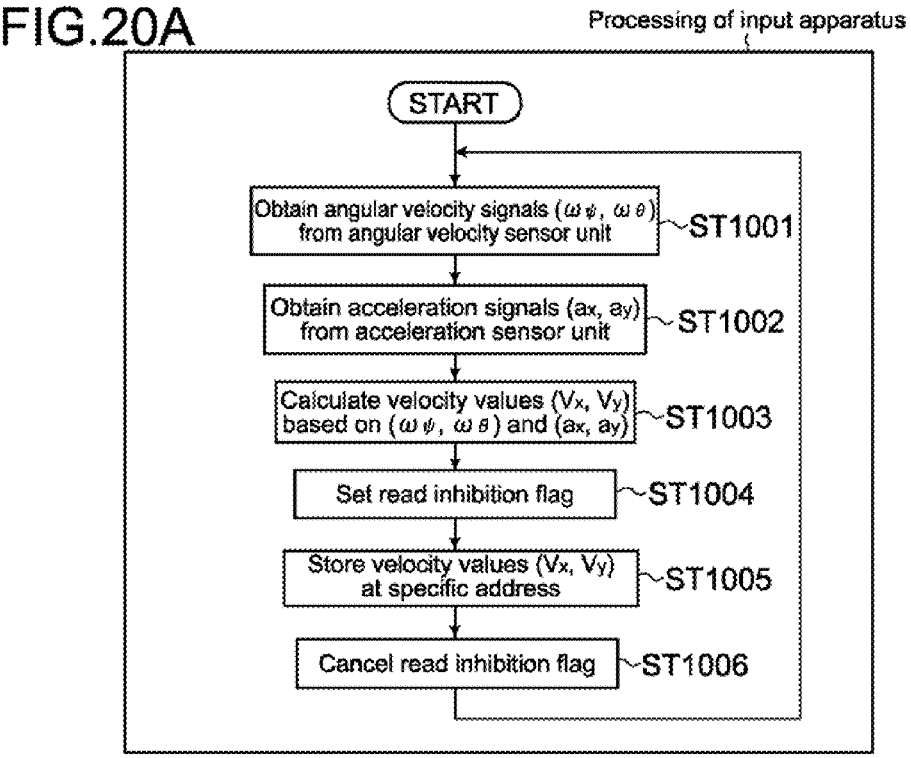
FIG. 20 are flowcharts showing operations of the input apparatus.
Figure 20B:
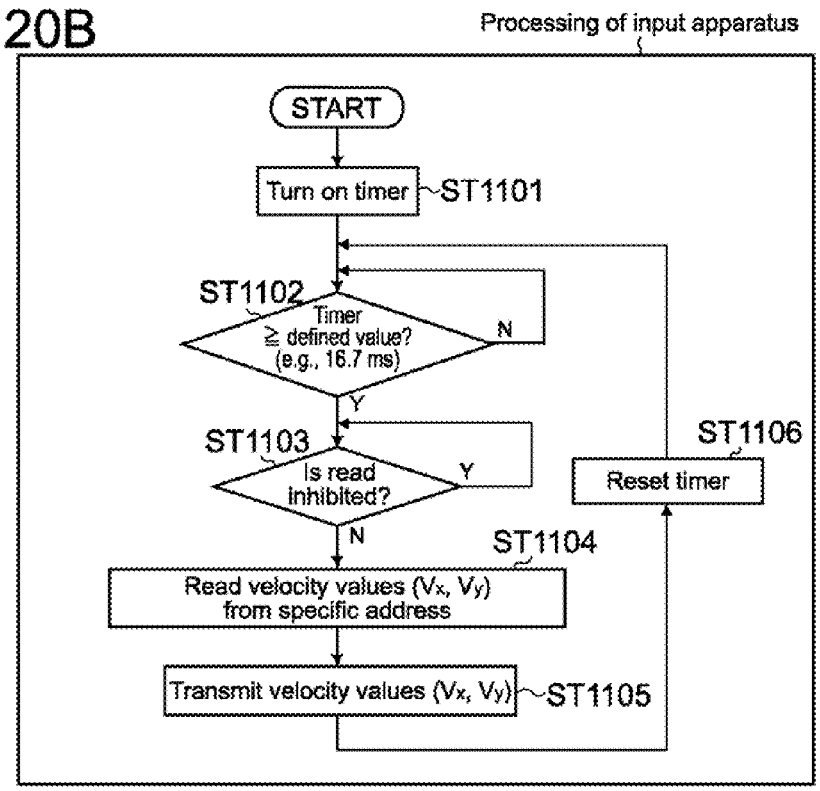

FIG. 20A is a flowchart showing an operation of the input apparatus 1 for calculating velocity values and FIG. 20B is a flowchart showing an operation of the input apparatus 1 for transmitting information on the velocity values. The flowchart of FIG. 20A is the same as that of FIG. 11A. Processing that is almost the same as that of FIG. 11B is executed in FIG. 20B.

FIG. 20B is different from FIG. 11B in that the defined value is set to a value corresponding to a time of 16.7 ms in Step 1102. Accordingly, the velocity values stored in the memory are read out and information on the velocity values is transmitted via the antenna 22 in a cycle of 16.7 ms. It should be noted that although the cycle of calculating velocity values may fluctuate more or less as described above (see FIG. 20A), the transmission cycle can be maintained at a regular cycle (16.7 ms) by the processing shown in FIG. 20B.

The defined value may be a value other than the value corresponding to 16.7 ms as long as it is a time shorter than the calculation cycle. For example, the defined value may be a value corresponding to half the time of the calculation cycle or a value corresponding to ⅟10 the time of the calculation cycle. The control apparatus 40 only needs to count the plotting cycle of the pointer by the timer in a cycle of 16.7 ms or execute plotting of the pointer 2 every time information on the velocity values is transmitted.

By the processing shown in FIG. 20, while the cycle in which the input apparatus 1 calculates the velocity values is about 84 ms, the input apparatus 1 can transmit the information on the velocity values in a cycle of 16.7 ms. Accordingly, the pointer can be moved smoothly on the screen 3 (see FIG. 19B) even when a time required for calculating velocity values becomes long due to reasons of complex calculations up to calculating the velocity values, a use of an inexpensive MPU 19, and the like.

Also in this embodiment, processing the same as those of FIGS. 15 and 16 described above may be executed. Specifically, transmission of information on velocity values may be restricted by judging whether the velocity values are 0 or values close to 0 and maintaining a state where the read inhibition flag is not canceled in the processing of calculating velocity values. Alternatively, the transmission of information on velocity values may be restricted by judging whether the velocity values are 0 or values close to 0 in the processing of transmitting velocity values.

Next, another embodiment of the control system 100 will be described.

The embodiments shown in FIGS. 11, 20, and the like have described a case where information on velocity values is transmitted from the input apparatus 1 in a regular cycle. In this embodiment, a cycle in which the input apparatus 1 transmits information on velocity values is controlled variably.

If a cycle in which the pointer 2 is plotted on the screen 3 is long when the velocity values of the pointer 2 are large, human beings tend to feel awkwardness regarding smoothness of the movement of the pointer. On the other hand, if the cycle in which the pointer 2 is plotted on the screen 3 is short when the velocity values of the pointer 2 are small, human beings hardly feels awkwardness regarding the smoothness of the movement of the pointer 2. In this regard, using this relationship in this embodiment, the transmission cycle is prolonged when the velocity values are small to thus realize power saving of the input apparatus 1.

Figure 21A:
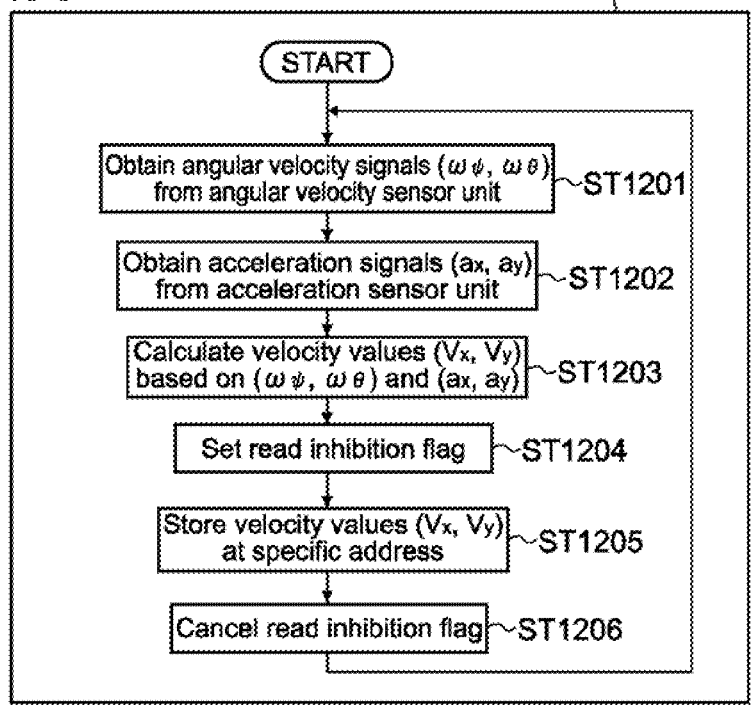
FIG. 21 are flowcharts showing operations of the input apparatus in the control system according to another embodiment.
Figure 21B:
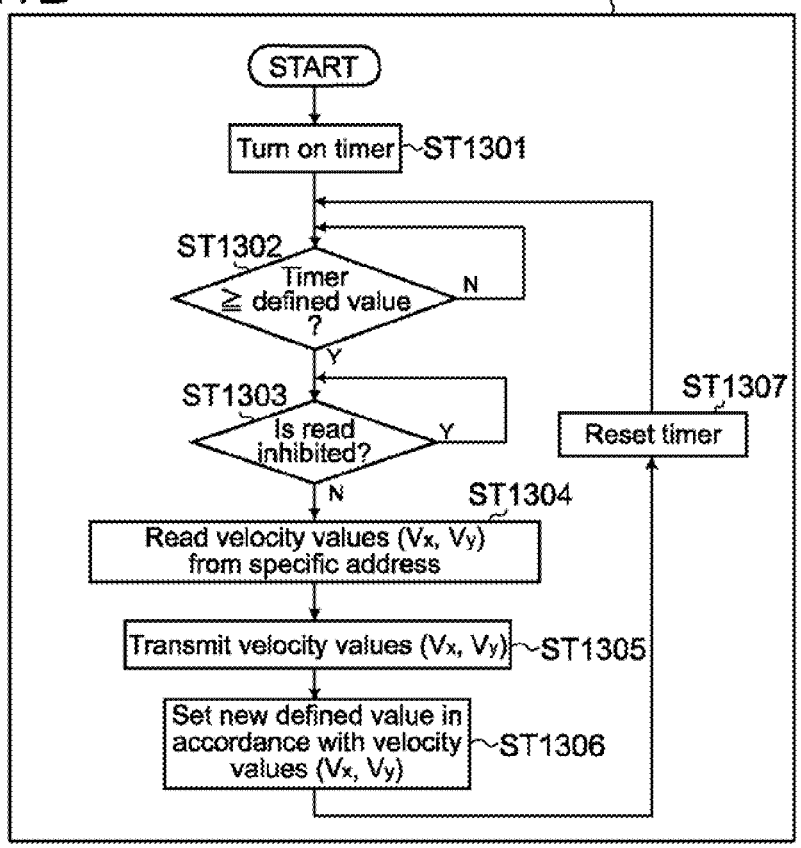

FIG. 21 are flowcharts showing operations of the input apparatus 1 in the control system 100 according to this embodiment. In FIG. 21A, processing the same as those of FIGS. 11A and 20A is executed. In this embodiment, processing shown in FIG. 21B is different from those of FIGS. 11B and 20B.

As shown in FIG. 21B, upon turning on a timer (Step 1301), the MPU 19 judges whether the timer is equal to or larger than a defined value (Step 1302). The defined value is a value related to a level of velocity values. A relationship between the velocity values and the defined value (transmission cycle) will be described later in detail.

When a variably-controlled time has elapsed since turning on the timer or resetting the timer (see Step 1307), the MPU 19 judges whether read of velocity values is inhibited (Step 1303). When the read of velocity values is not inhibited, the MPU 19 reads the velocity values from a specific address in the memory (Step 1304) and transmits the velocity values via the antenna 22 (Step 1305).

Upon transmitting the velocity values, the MPU 19 sets a new defined value based on a level of the velocity values (Step 1306). Upon setting the new defined value, the MPU 19 resets the timer (Step 1307) and repeats the processes of Step 1302 and subsequent steps.

Here, the relationship between the velocity values and the transmission cycle will be described. FIGS. 22A to 22D are diagrams showing examples of the relationship between the velocity values and the transmission cycle. As shown in FIGS. 22A to 22D, a transmission cycle T is prolonged when an absolute value of the velocity values is equal to or smaller than a predetermined threshold value Th.

Figure 22A:
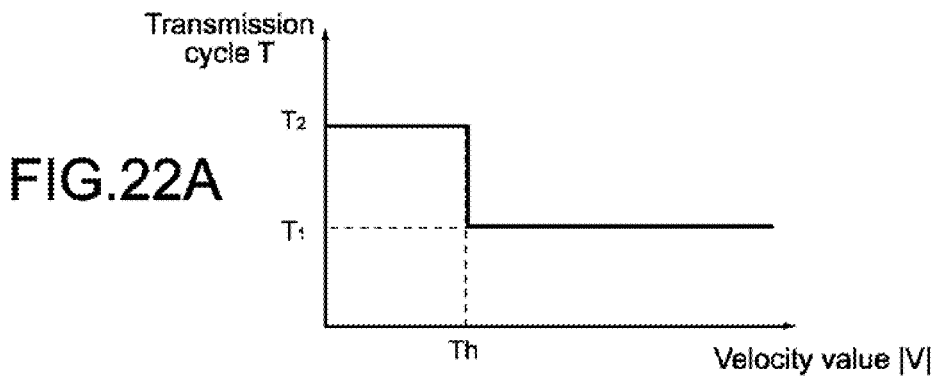
FIG. 22 are diagrams showing examples of a relationship between a velocity value and a transmission cycle.

FIG. 22A is a diagram showing an example of a case where the transmission cycle is prolonged stepwise when the absolute value of the velocity values |V| is equal to or smaller than the threshold value Th. As shown in FIG. 22A, when the absolute value of the velocity values |V| is equal to or smaller than the predetermined threshold value, a transmission cycle $T_1$ (e.g., 16.7 ms) becomes a transmission cycle $T_2$ (e.g., 33.4 ms) and the transmission cycle is thus prolonged. The transmission cycle $T_1$ and the transmission cycle $T_2$ can be changed as appropriate. In addition, the predetermined threshold value Th is set as appropriate within a range in which a user does not feel awkwardness regarding the movement of the pointer 2 due to the prolongation of the transmission cycle (plotting cycle). Accordingly, power consumption of the input apparatus 1 can be reduced appropriately without causing the user to feel awkwardness regarding the smoothness of the movement of the pointer 2.

Figure 22B:
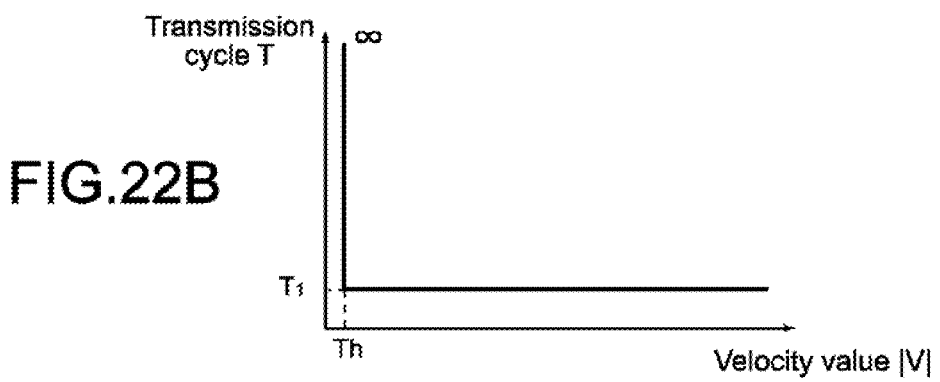

FIG. 22B is a diagram showing a relationship between a corresponding value and the transmission cycle in a case where the predetermined threshold value Th shown in FIG. 22A is set to 0 or a value close to 0 and the transmission cycle $T_2$ at a time when an absolute value of the corresponding value is equal to or smaller than a threshold value is set to be infinite. As described above, when the velocity values are 0 or almost 0, the pointer 2 does not move or hardly moves on the screen 3 even when information on the velocity values is transmitted. Therefore, necessity of transmitting the information on the velocity values is low. In this regard, in FIG. 22B, the transmission of the velocity values is restricted by setting the transmission cycle to be infinite when the absolute value of the velocity values is 0 or a value close to 0. Accordingly, power consumption of the input apparatus 1 can be reduced.

Figure 22C:
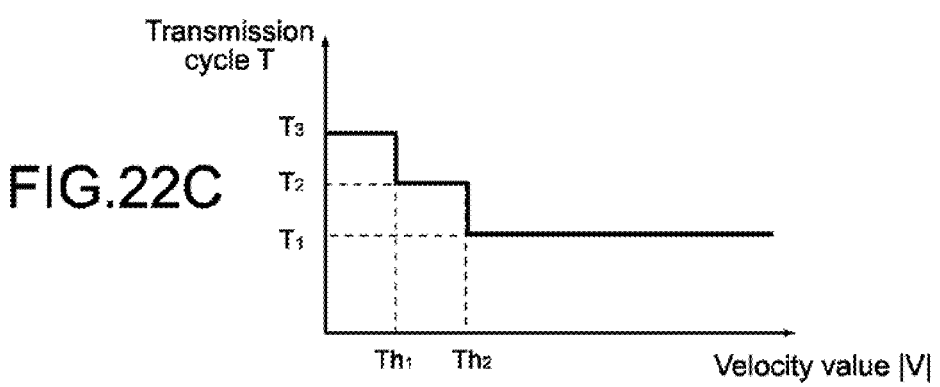

FIG. 22C is a diagram showing an example of a case where the transmission cycle is prolonged in two steps along with a decrease in the absolute value of the velocity values when the absolute value of the velocity values |V| is equal to or smaller than a threshold value. The transmission cycle $T_1$, the transmission cycle $T_2$, and a transmission cycle $T_3$ are, for example, 16.7 ms, 25 ms, and 33.4 ms, respectively. The transmission cycles $T_1$ to $T_3$ can be changed as appropriate. Moreover, predetermined threshold values $Th_1$ and $Th_2$ are set as appropriate within a range in which a user does not feel awkwardness regarding the movement of the pointer 2 due to the prolongation of the transmission cycle (plotting cycle). Accordingly, power consumption of the input apparatus 1 can be reduced appropriately without causing the user to feel awkwardness regarding the smoothness of the movement of the pointer 2. It should be noted that it is also possible to set the threshold value $Th_1$ to 0 or a value close to 0 and set the transmission cycle within a range of 0 to $Th_1$ to be infinite.

Figure 22D:
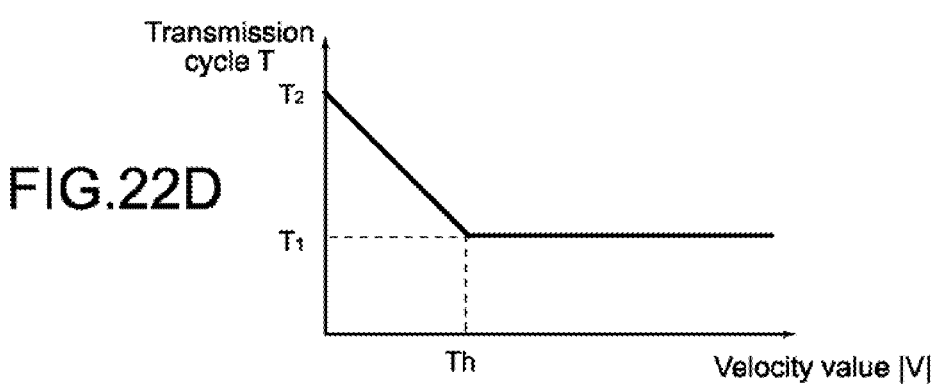

FIG. 22D is a diagram showing an example of a case where, when the absolute value of the velocity values |V| is equal to or smaller than a threshold value, the transmission cycle is prolonged linear-functionally along with a decrease in the absolute value of the velocity values. It should be noted that the transmission cycle may be set to be infinite when the corresponding value is 0 or a value close to 0. Moreover, instead of prolonging the transmission cycle linear-functionally, it is also possible to prolong the transmission cycle by a multi-degree function or exponentially.

Next, another embodiment of a case where the transmission cycle is varied will be described.

Figure 28A:
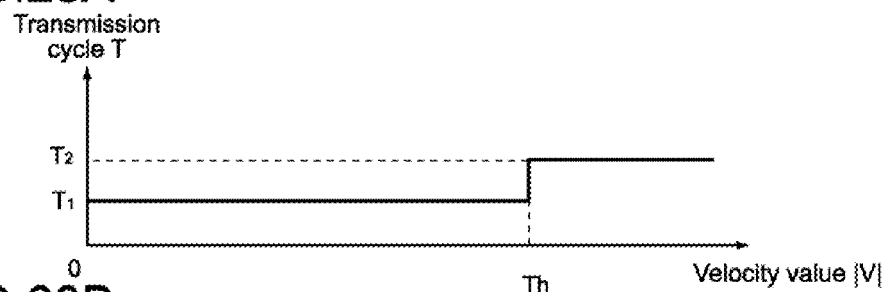
FIG. 28 are diagrams showing relationships between the transmission cycle and the velocity value.

FIGS. 28A to 28D are diagrams showing relationships between the transmission cycle and the velocity values of the input apparatus 1 according to this embodiment. As shown in FIG. 28A, when the absolute value of the velocity values |V| is equal to or larger than a predetermined threshold value Th, the transmission cycle of the velocity values is prolonged.

For example, in a case where a movement velocity of the pointer 2 on the screen 3 is extremely large, even when the cycle of plotting the movement of the pointer 2 is long, human beings hardly feel awkwardness regarding the smoothness of the movement of the pointer. Alternatively, it is imperceptible since a velocity of the pointer 2 is too fast. In this regard, in this embodiment, using this relationship, the transmission cycle is controlled to be prolonged when the absolute value of the velocity values |V| is equal to or larger than the predetermined threshold value Th, to thus realize a reduction in power consumption of the input apparatus 1.

FIG. 28A is a diagram showing an example of a case where the transmission cycle is prolonged stepwise when the absolute value of the velocity values |V| is equal to or larger than a predetermined threshold value Th. As shown in FIG. 28A, when the absolute value of the velocity values |V| is equal to or larger than the predetermined threshold value, the transmission cycle $T_1$ (e.g., 16.7 ms) becomes the transmission cycle $T_2$ (e.g., 33.4 ms) and the transmission cycle is thus prolonged. Here, the predetermined threshold value Th is set as appropriate within a range in which a user does not feel awkwardness regarding the smoothness of the movement of the pointer 2. Accordingly, since the transmission cycle T is prolonged when the velocity of the pointer 2 on the screen is extremely fast, for example, power consumption of the input apparatus 1 can be reduced appropriately without causing the user to feel awkwardness regarding the smoothness of the movement of the pointer 2.

Figure 28B:
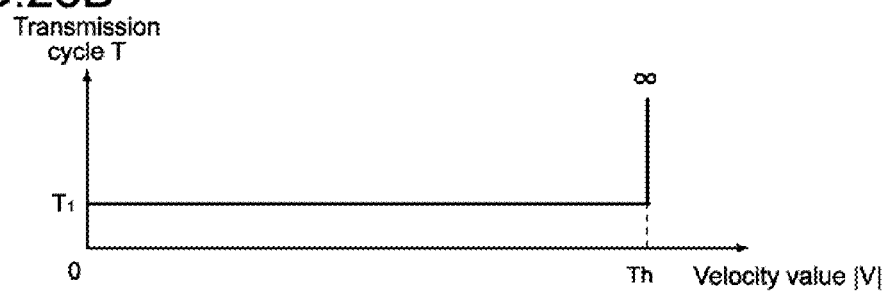

FIG. 28B is a diagram showing an example of a case where the transmission cycle is set to be infinite when the absolute value of the velocity values |V| is equal to or larger than a predetermined threshold value Th. As shown in FIG. 28B, when the absolute value of the velocity values |V| is equal to or larger, than the predetermined threshold value Th, the transmission cycle is set to be infinite and transmission of information of the velocity values is restricted. Accordingly, power consumption can be reduced appropriately.

Figure 28C:
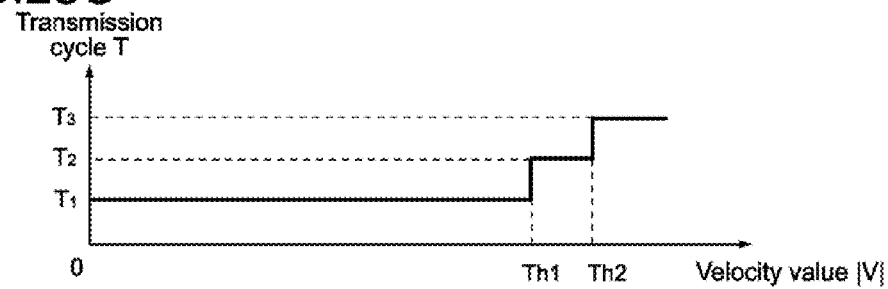

FIG. 28C is a diagram showing an example of a case where the transmission cycle is prolonged in two steps along with an increase in the absolute value of the velocity values when the absolute value of the velocity values |V| is equal to or larger than a predetermined threshold value. The transmission cycle $T_1$, the transmission cycle $T_2$, and the transmission cycle $T_3$ can be changed as appropriate. Moreover, predetermined threshold values $Th_1$ and $Th_2$ are set as appropriate within a range in which a user does not feel awkwardness regarding the movement of the pointer 2 due to the prolongation of the transmission cycle (plotting cycle). Accordingly, power consumption of the input apparatus 1 can be reduced appropriately without causing the user to feel awkwardness regarding the smoothness of the movement of the pointer 2. It should be noted that it is also possible to set the transmission cycle to be infinite when the absolute value of the velocity values is equal to or larger than the threshold value $Th_2$.

Figure 28D:
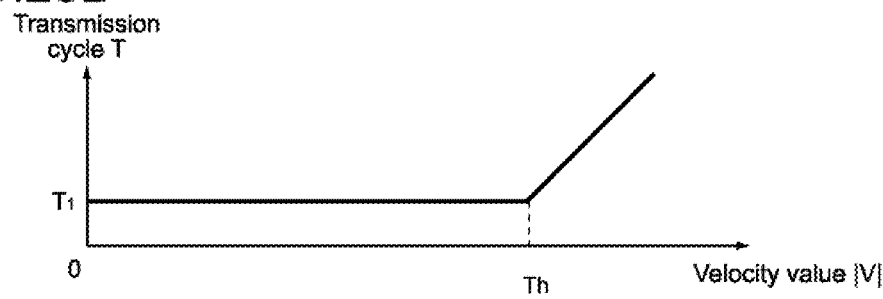

FIG. 28D is a diagram showing an example of a case where, when the absolute value of the velocity values |V| is equal to or larger than a threshold value Th, the transmission cycle is prolonged linear-functionally along with an increase in the absolute value of the velocity values. It should be noted that instead of prolonging the transmission cycle linear-functionally, it is also possible to prolong the transmission cycle by a multi-degree function or exponentially.

Figure 29:
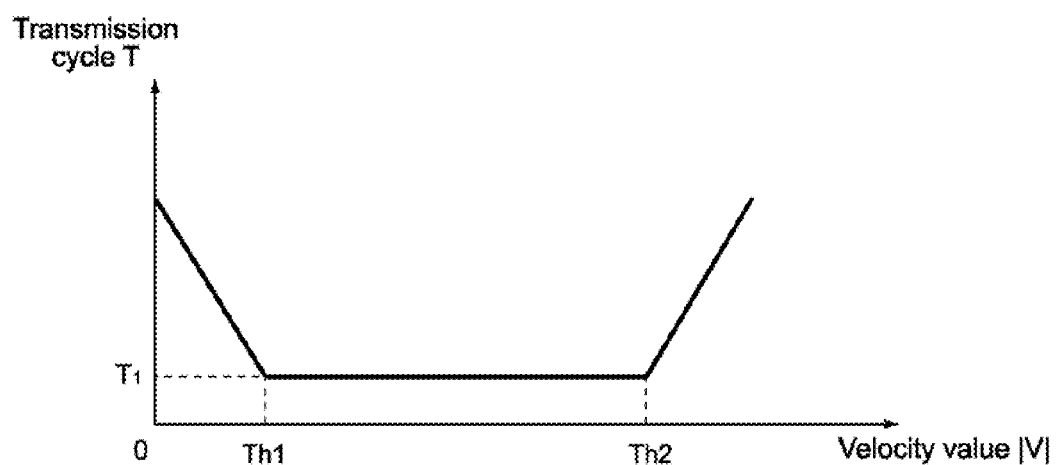
FIG. 29 is a diagram showing a relationship between the transmission cycle and the velocity value.

Any one of FIGS. 22A to 22D and any one of FIGS. 28A to 28D may be combined. FIG. 29 is a diagram showing an example of a relationship between the absolute value of the velocity values |V| and the transmission cycle T in a case where FIG. 22D and FIG. 28D are combined.

Next, an embodiment of a case where the control apparatus 40 variably controls the plotting cycle will be described.

In the descriptions on FIGS. 10 and 12 above, a case where the control apparatus 40 maintains a regular plotting cycle of 16.7 ms has been described. In this embodiment, the control apparatus 40 variably controls the plotting cycle that is a cycle of plotting the movement of the pointer 2. Specifically, in this embodiment, the control apparatus 40 receives information on velocity values transmitted from the input apparatus 1 and variably controls the plotting cycle in accordance with the received velocity values.

FIGS. 31 and 32 are diagrams showing relationships between the absolute value of the velocity values |V| and the plotting cycle T. FIGS. 31 and 32 respectively correspond to FIGS. 22 and 28 described above, and the transmission cycle on the ordinate axes is changed to the plotting cycle T.

As shown in FIGS. 31A to 31D, when the absolute value of the velocity values |V| is equal to or smaller than a predetermined threshold value Th, the MPU 35 of the control apparatus 40 controls the plotting cycle to be prolonged. In other words, since, even if the cycle of plotting the movement of the pointer 2 on the screen 3 is short when the velocity values of the pointer 2 are small, human beings hardly feel awkwardness regarding the smoothness of the movement of the pointer 2, the MPU 35 prolongs the plotting cycle when the absolute value of the velocity values is equal to or smaller than the predetermined threshold value. By such processing, the movement of the pointer 2 can be plotted smoothly without causing the user to feel awkwardness regarding the movement of the pointer 2.

As shown in FIGS. 32A to 32D, when the absolute value of the velocity values |V| is equal to or larger than a predetermined threshold value Th, the MPU 35 of the control apparatus 40 controls the plotting cycle to be prolonged. In other words, since, even if the cycle of plotting the movement of the pointer 2 is long when the velocity values of the pointer 2 are extremely large, human beings hardly feel awkwardness regarding the smoothness of the movement of the pointer 2, the MPU 35 prolongs the plotting cycle when the absolute value of the velocity values |V| is equal to or larger than the predetermined threshold value Th. By such processing, the movement of the pointer 2 can be plotted smoothly without causing the user to feel awkwardness regarding the movement of the pointer 2.

Any one of FIGS. 31A to 31D and any one of FIGS. 32A to 32D may be combined.

Figure 23:
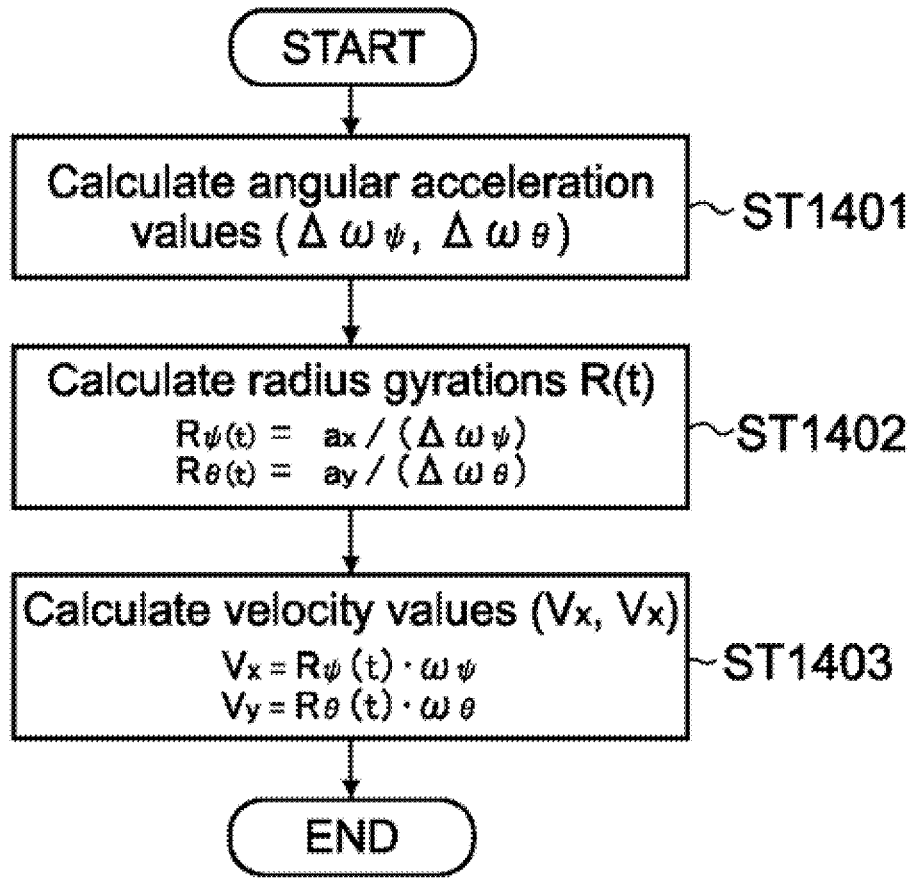
FIG. 23 is a flowchart showing an operation of the input apparatus.
Figure 24:
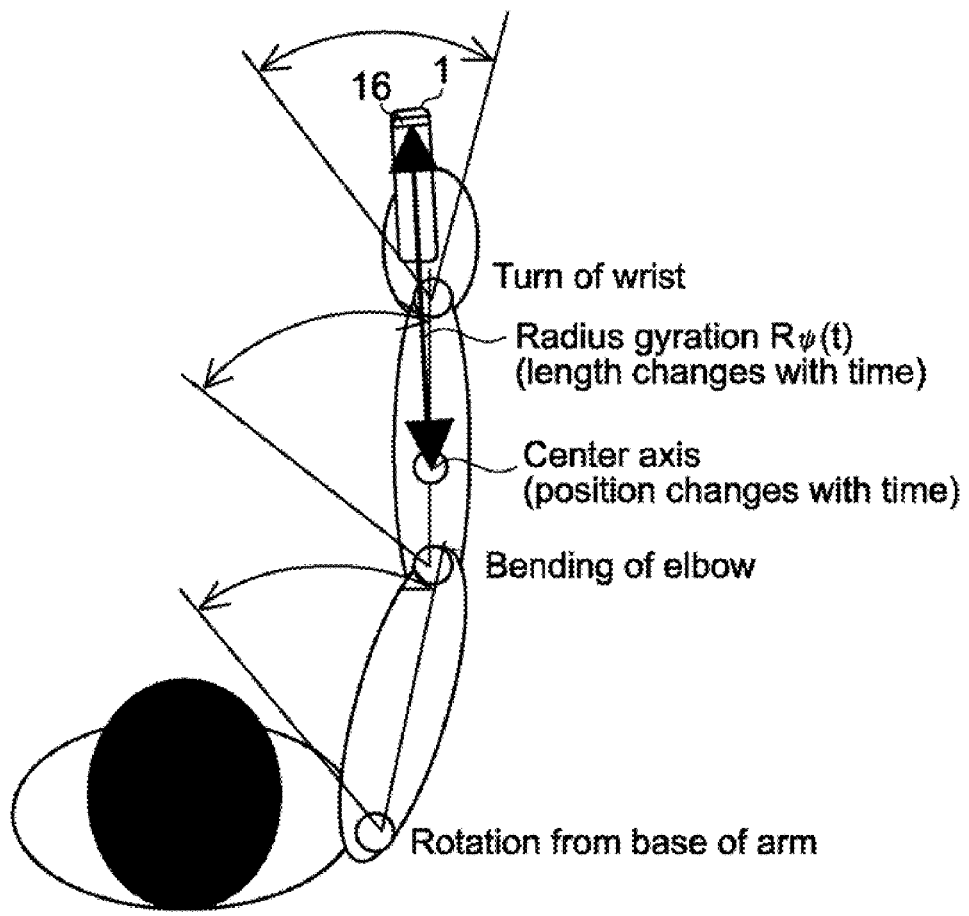
FIG. 24 is a diagram for illustrating a basic idea of a velocity value calculation method.

Hereinafter, a method of calculating velocity values ($V_x$, $V_y$) in Step 103 of FIG. 9 or Step 203 of FIG. 11A will be described. FIG. 23 is a flowchart showing an operation of the input apparatus 1. FIG. 24 is a diagram for illustrating a basic idea of the velocity value calculation method. It should be noted that in descriptions below, the first angular velocity value $\omega\psi$ and the second angular velocity value $\omega\theta$ may be referred to as angular velocity value $\omega\psi$ about the Y' axis and angular velocity value $\omega\theta$ about the X' axis, respectively.

FIG. 24 is a top view of the user operating the input apparatus 1 by swinging it in, for example, the lateral direction (yaw direction). As shown in FIG. 24, when the user operates the input apparatus 1 naturally, an operation is made by using at least one of a turn of a wrist, a bending of an elbow, and a rotation from a base of an arm. Therefore, a comparison between the movement of the input apparatus 1 and the rotations of a wrist, elbow, and base of an arm shows that there exist relationships of 1 and 2 below.

1. The angular velocity value $\omega_\psi$ about the Y' axis of a portion of the input apparatus 1 at which the acceleration sensor unit 16 is disposed (hereinafter, referred to as tip end portion) is a combined value of an angular velocity obtained by the turn of a wrist, an angular velocity obtained by the bending of an elbow, and an angular velocity obtained by the rotation from a base of an arm.

2. The velocity value $V_x$ at the tip end portion of the input apparatus 1 is a combined value of values obtained by respectively multiplying the angular velocities of the wrist, elbow, and base of an arm by a distance between the wrist and the tip end portion, a distance between the elbow and the tip end portion, and a distance between the base of an arm and the tip end portion.

Here, regarding a rotational movement of the input apparatus 1 in a minute time, the input apparatus 1 can be considered to be rotating about a center axis parallel to the Y axis and whose position changes with time. Assuming that a distance between the center axis whose position changes with time and the tip end portion of the input apparatus 1 is a radius gyration $R_\psi(t)$ about the Y' axis, the relationship between the velocity value $V_x$ and the angular velocity value $\omega_\psi$ at the tip end portion of the input apparatus 1 can be expressed by Equation (4) below. In other words, the velocity value $V_x$ becomes a value obtained by multiplying the angular velocity value $\omega_\psi$ about the Y' axis by the distance $R_\psi(t)$ between the center axis and the tip end portion. It should be noted that in this embodiment, the acceleration sensor unit 16 and the angular velocity sensor unit 15 are provided integrally on the circuit board 25 of the sensor unit 17. Therefore, the radius gyration R(t) becomes a distance from the center axis to the sensor unit 17. However, when the acceleration sensor unit 16 and the angular velocity sensor unit 15 are provided apart from each other inside the casing 10, the distance from the center axis to the acceleration sensor unit 16 becomes the radius gyration R(t).

$$V_x = R_\psi(t) * \omega_\psi \quad (4)$$

As shown in Equation (4), the relationship between the velocity value and the angular velocity value at the tip end portion of the input apparatus 1 is a proportional relationship with R(t) as a proportional constant, that is, a correlation.

Equation (4) above is modified to obtain Equation (5).

$$R_\psi(t) = V_x/\omega_\psi \quad (5)$$

The right-hand side of Equation (5) is a velocity dimension. Even when the velocity value and the angular velocity value represented on the right-hand side of Equation (5) are differentiated to obtain a dimension of the acceleration or acceleration time change rate, the correlation is not lost. Similarly, even when the velocity value and the angular velocity value are integrated to obtain a displacement dimension, the correlation is not lost.

Therefore, with the velocity and the angular velocity represented on the right-hand side of Equation (5) as a dimension of the displacement, acceleration, and acceleration time change rate, Equations (6), (7), and (8) below can be obtained.

$$R_\psi(t) = x/_\psi \quad (6)$$

$$R_\psi(t) = a_x/\Delta\omega_\psi \quad (7)$$

$$R_\psi(t) = \Delta a_x/\Delta(\Delta\omega_\psi) \quad (8)$$

Focusing on Equation (7) out of Equations (5), (6), (7), and (8) above, for example, it can be seen that the radius gyration $R_\psi(t)$ can be obtained if the acceleration value ax and the angular acceleration value $\Delta\omega_\psi$ are known. As described above, the first acceleration sensor 161 detects the acceleration value ax in the X'-axis direction, and the first angular velocity sensor 151 detects the angular velocity value $\omega_\psi$ about the Y' axis. Therefore, if the angular velocity value $\omega_\psi$ about the Y' axis is differentiated to thus calculate the angular acceleration value $\Delta\omega_\psi$ about the Y' axis, the radius gyration $R_\psi(t)$ about the Y' axis can be obtained.

If the radius gyration $R_\psi(t)$ about the Y' axis is known, the velocity value $V_x$ of the input apparatus 1 in the X'-axis direction can be obtained by multiplying the radius gyration $R_\psi(t)$ by the angular velocity value $\omega_\psi$ about the Y' axis detected by the first angular velocity sensor 151 (see Equation (4)). Specifically, a rotational operation amount itself of the user is converted into a linear velocity value in the X'-axis direction, with the result that a velocity value that matches an intuition of the user is obtained. Therefore, because the movement of the pointer 2 becomes a natural movement with respect to the movement of the input apparatus 1, operability of the input apparatus for the user is improved.

This velocity value calculation method can also be applied to a case where the user operates the input apparatus 1 by swinging it in the vertical direction (pitch direction).

FIG. 23 shows an example where Equation (7) is used. By differentiating the angular velocity values ($\omega_\psi$, $\omega_\theta$) obtained from the angular velocity sensor unit 15, the MPU 19 of the input apparatus 1 calculates angular acceleration values ($\Delta\omega_\psi$, $\Delta\omega_\theta$) (Step 1401).

Using the acceleration values ($a_x$, $a_y$) from the acceleration sensor unit 16 and the angular acceleration values ($\Delta\Omega_\psi$, $\Delta\Omega_\theta$), the MPU 19 calculates the radius gyrations ($R_\psi(t)$, $R_\theta(t)$) about the Y' axis and the X' axis using Equations (7) and (9) (Step 1402).

$$R_\psi(t) = a_x/\Delta\omega_\psi \quad (7)$$

$$R_\theta(t) = a_y/\Delta\omega_\theta \quad (9)$$

After the radius gyrations are calculated, the velocity values (Vx, Vy) are calculated using Equations (4) and (10) (Step 1403).

$$V_x = R_\psi(t) * \omega_\psi \quad (4)$$

$$V_y = R_\theta(t) * \omega_\theta \quad (10)$$

The rotational operation amounts themselves of the input apparatus 1 made by the user are thus converted into linear velocity values in the X- and Y-axis directions, with the result that the velocity values that match the intuition of the user are obtained.

Further, by using the acceleration values ($a_x$, $a_y$) detected by the acceleration sensor unit 16 as they are, a calculation amount and power consumption of the input apparatus 1 can be reduced.

The MPU 19 only needs to obtain (ax, ay) from the acceleration sensor unit 16 every predetermined number of clocks and calculate the velocity values ($V_x$, $V_y$) in sync therewith, for example. Alternatively, the MPU 19 may calculate the velocity values ($V_x$, $V_y$) once every time a plurality of acceleration values ($a_x$, $a_y$) are sampled.

Figure 25:
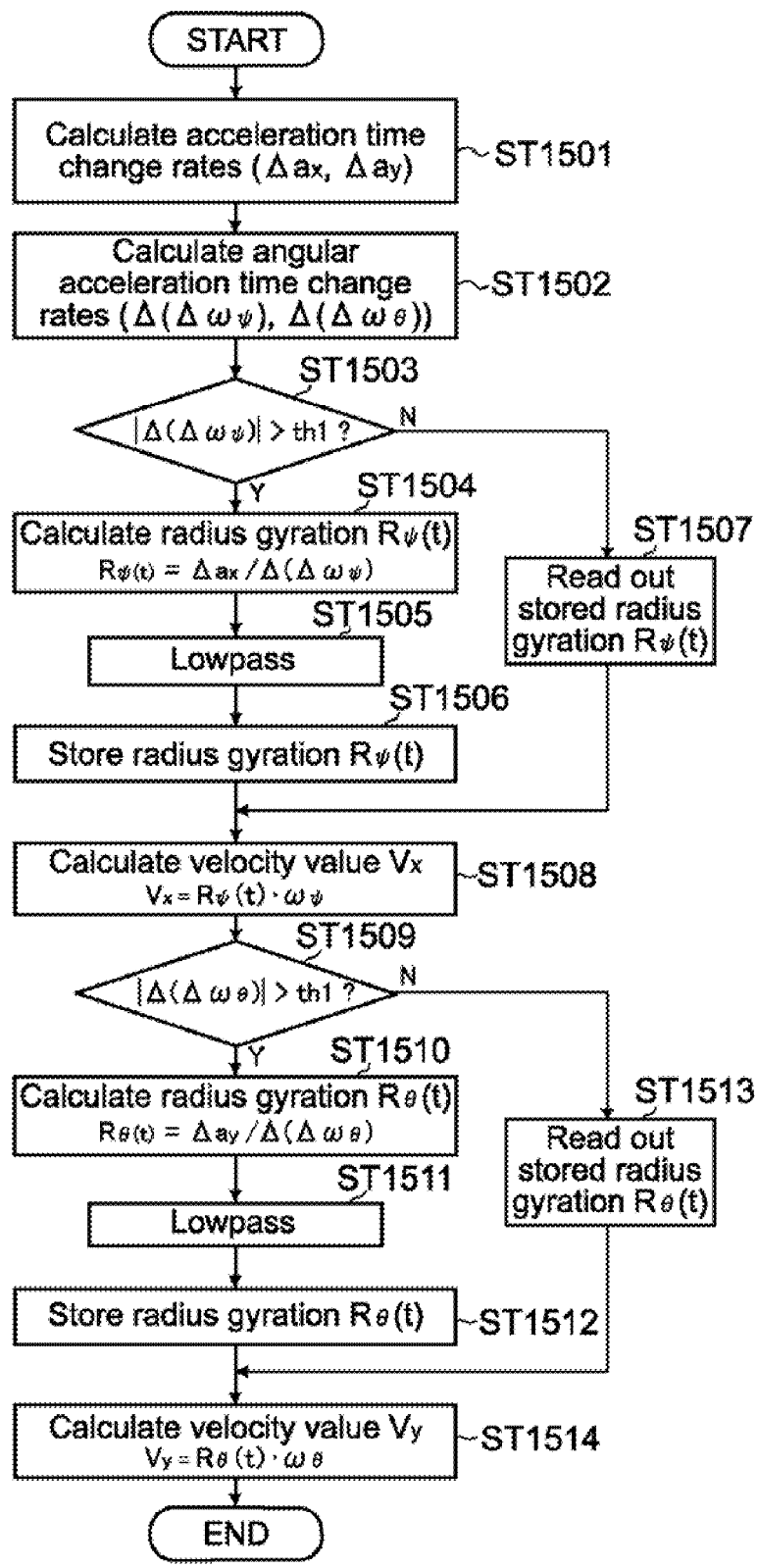
FIG. 25 is a flowchart showing an operation of the input apparatus.

Next, another embodiment of calculating the velocity values ($V_x$, $V_y$) using the radius gyrations as in FIG. 23 will be described. FIG. 25 is a flowchart showing an operation of the input apparatus 1. FIG. 25 describes an example where Equation (8) above is used.

The MPU 19 of the input apparatus 1 differentiates the acceleration values ($a_x$, $a_y$) from the acceleration sensor unit 16. Accordingly, acceleration time change rates ($\Delta a_x$, $\Delta a_y$) are calculated (Step 1501). Similarly, the MPU 19 carries out a second order differentiation operation on the angular velocity values ($\omega_\psi$, $\omega_\theta$) from the angular velocity sensor unit 15 to calculate angular acceleration time change rates ($\Delta(\Delta\omega_\psi)$, $\Delta(\Delta\omega_\theta)$)) (Step 1502).

Upon calculating the angular acceleration time change rates, the MPU 19 judges whether an absolute value of the angular acceleration time change rate $|\Delta(\Delta\omega_\psi)|$ about the Y' axis exceeds a threshold value th1 (Step 1503). When $|\Delta(\Delta\omega_\psi)|$ above exceeds the threshold value th1, the MPU 19 calculates the radius gyration $R_\psi(t)$ about the Y' axis by dividing the acceleration time change rate $\Delta ax$ in the X'-axis direction by the angular acceleration time change rate $\Delta(\Delta\omega_\psi)$ about the Y' axis (Step 1504). In other words, a ratio of the acceleration time change rate $\Delta ax$ in the X'-axis direction to the angular acceleration time change rate $\Delta(\Delta\omega_\psi)$ about the Y' axis is calculated as the radius gyration $R_\psi(t)$ (Equation (8)). The threshold value th1 of $|\Delta(\Delta\omega_\psi)|$ can be set as appropriate.

A signal of the radius gyration $R_\psi(t)$ is passed through a lowpass filter, for example (Step 1505). Information on the radius gyration $R_\psi(t)$ from which noises of a high-frequency range have been removed by the lowpass filter is stored in a memory (Step 1506). The memory updates the signal of the radius gyration $R_\psi(t)$ every predetermined number of clocks and stores it.

By multiplying the radius gyration $R_\psi(t)$ by the angular velocity value $\omega_\psi$ about the Y' axis, the MPU 19 of the input apparatus 1 calculates the velocity value $V_x$ in the X'-axis direction (Step 1508).

On the other hand, when $|\Delta(\Delta\omega_\psi)|$ above is equal to or smaller than the threshold th1, the MPU 19 reads out the radius gyration $R_\psi(t)$ stored in the memory (Step 1507). By multiplying the read-out radius gyration $R_\psi(t)$ by the angular velocity value $\omega_\psi$ about the Y' axis, the velocity value $V_x$ in the X'-axis direction is calculated (Step 1508).

There are the following two reasons for carrying out the processes of Steps 1501 to 1508.

One is to obtain the radius gyration $R_\psi(t)$ of Equation (8) above to thus obtain a linear velocity that matches the intuition of the user.

Second is to remove a gravitational effect in the process of calculating the velocity values ($V_x$, $V_y$). When the input apparatus 1 is tilted in the roll direction or the pitch direction from its reference position, detection signals different from the actual movement of the input apparatus 1 are inadvertently output due to the gravitational effect. When the input apparatus 1 is tilted in the pitch direction, for example, gravity acceleration component values are output from the acceleration sensor 162. Therefore, when the effect of the gravity acceleration component values is not removed, the movement of the pointer 2 becomes a movement that does not match a sense of the user.

FIG. 26 are diagrams for illustrating a gravitational effect with respect to the acceleration sensor unit 16. FIG. 26 are diagrams showing the input apparatus 1 seen from the Z direction.

In FIG. 26A, the input apparatus 1 is in the reference position and is held still. At this time, an output of the first acceleration sensor 161 is substantially 0, and an output of the second acceleration sensor 162 is an output corresponding to a gravity acceleration G. However, as shown in FIG. 26B, for example, in a state where the input apparatus 1 is tilted in the roll direction, the first and second acceleration sensors 161 and 162 respectively detect acceleration values of tilt components of the gravity acceleration G.

In this case, the first acceleration sensor 161 detects the acceleration in the X'-axis direction even when the input apparatus 1 is not actually moved in the X-axis direction in particular. The state shown in FIG. 26B is equivalent to a state where, when the input apparatus 1 is in the reference position as shown in FIG. 26C, the acceleration sensor unit 16 has received inertial forces Ix and Iy as respectively indicated by arrows with broken lines, thus being undistinguishable by the acceleration sensor unit 16. As a result, the acceleration sensor unit 16 judges that an acceleration in a downward left-hand direction as indicated by an arrow is applied to the input apparatus 1 and outputs a detection signal different from the actual movement of the input apparatus 1. In addition, because the gravity acceleration G constantly acts on the acceleration sensor unit 16, an integration value of the acceleration used for calculating the velocity from the acceleration is increased and an amount by which the pointer 2 is displaced in the downward oblique direction is increased at an accelerating pace. When the state is shifted from that shown in FIG. 26A to that shown in FIG. 26B, it is considered that inhibition of the movement of the pointer 2 on the screen 3 is an operation that intrinsically matches the intuition of the user.

FIG. 27 are diagrams for illustrating an effect of gravity accelerations at a time when the input apparatus 1 is swung in the pitch direction, the input apparatus 1 being seen from the X direction.

For example, when the input apparatus 1 is rotated in the pitch direction from the reference position as shown in FIG. 27A to tilt as shown in FIG. 27B, because the gravity acceleration G detected by the second acceleration sensor 162 at the time the input apparatus 1 is in the reference position decreases, it is difficult for the input apparatus 1 to make a distinction from the inertial force 1 in the pitch direction as shown in FIG. 27C.

In this regard, a fact that a time change rate of the gravity acceleration component value generated by the movement of the input apparatus 1 is smaller than the acceleration value time change rate that focuses on a movement inertial component (movement only) of the input apparatus 1 caused by the operation of the user is used. The time change rate of the gravity acceleration component value is a 1/10 order of a time change rate of the movement inertial component value generated by the operation of the user. The value output from the acceleration sensor unit 16 is a value obtained by combining those two, that is, the signal output from the acceleration sensor unit 16 is a signal obtained by superimposing a low-frequency component value as the gravity acceleration component value on the time change rate of the movement inertial component value generated by the operation of the user.

Therefore, by differentiating the acceleration values in Step 1501, the acceleration time change rates can be obtained. Accordingly, the time change rate of the gravity acceleration component value is removed. As a result, even in the case where a change in a component force of the gravity acceleration due to the tilt of the input apparatus 1 is generated, the radius gyrations can be obtained appropriately, and appropriate velocity values can be calculated from the radius gyrations.

It should be noted that there are cases where, in addition to the gravity acceleration component value, the low-frequency component value contains, for example, a temperature drift of the acceleration sensor unit 16 or a DC offset value.

Moreover, because Equation (8) is used in this embodiment, in Step 1502, a second order differentiation is carried out on the angular velocity value $\omega_\psi$, and noises of a high-frequency range are superimposed on an operational value of the angular velocity. Though there is no problem when $|\Delta(\Delta\omega_\psi)|$ is large, when small, S/N deteriorates. When $|\Delta(\Delta\omega_\psi)|$ with S/N deteriorated is used in the calculation of $R_\psi(t)$ in Step 1504, precision of $R_\psi(t)$ and the velocity value $V_x$ deteriorates.

In this regard, in Step 1503, the angular acceleration time change rate $\Delta(\Delta\omega_\psi)$ about the Y' axis calculated in Step 1502 is used. When $\Delta(\Delta\omega_\psi)$ is equal to or smaller than the threshold value th1, the radius gyration $R_\psi(t)$ previously stored in the memory and that has less noise is read out (Step 1507), and the read-out radius gyration $R_\psi(t)$ is used in calculating the velocity value $V_x$ in Step 1508.

In Steps 1509 to 1514, the MPU 19 calculates the velocity value Vy in the Y'-axis direction in the same manner as in the processes of Steps 1503 to 1508 above. In other words, the MPU 19 judges whether an absolute value of the angular acceleration time change rate $|\Delta(\Delta\omega_\theta)|$ about the X' axis exceeds the threshold value th1 (Step 1509), and when exceeding the threshold value th1, calculates the radius gyration $R_\theta(t)$ about the X' axis using the angular acceleration time change rate (Step 1510).

A signal of the radius gyration $R_\theta(t)$ is passed through a lowpass filter (Step 1511) and stored in the memory (Step 1512). When equal to or smaller than the threshold value th1, the radius gyration $R_\theta(t)$ stored in the memory is read out (Step 1513), and the velocity value $V_y$ in the Y'-axis direction is calculated based on the radius gyration $R_\theta(t)$ (Step 1514).

It should be noted that although the same threshold value th1 is used in both the yaw direction and the pitch direction in this embodiment, different threshold values may be used for those directions.

In Step 1503, it is also possible to judge the angular acceleration value ($\Delta\omega_\psi$), based on the threshold value, instead of $\Delta(\Delta\omega_\psi)$. Also in Step 1509, it is possible to judge the angular acceleration value ($\Delta\omega_\theta$) based on the threshold value, instead of $\Delta(\Delta\omega_\theta)$. In the flowchart shown in FIG. 25, Equation (8) has been used for calculating the radius gyration R(t). However, because the angular acceleration values ($\Delta\omega_\psi$, $\Delta\omega_\theta$) are calculated when using Equation (8), the angular acceleration values ($\Delta\omega_\psi$, $\Delta\omega_\theta$) may be judged based on the threshold value.

The above embodiments have described the biaxial acceleration sensor unit and the biaxial angular velocity sensor unit. However, the present invention is not limited thereto, and the input apparatus 1 may include triaxial acceleration sensors and triaxial angular velocity sensors whose axes are mutually orthogonal. Alternatively, the processing shown in the above embodiments can be realized with only one of the triaxial acceleration sensors and triaxial angular velocity sensors. Alternatively, the input apparatus 1 may include a uniaxial acceleration sensor or a uniaxial angular velocity sensor. In the case of the uniaxial acceleration sensor or the uniaxial angular velocity sensor, typically a screen on which a plurality of pointing targets of the pointer 2 displayed on the screen 3 are arranged uniaxially is conceivable.

Alternatively, the input apparatus 1 may include a geomagnetic sensor, an image sensor, or the like in place of the acceleration sensors and angular velocity sensors.

In the input apparatus according to the above embodiments, input information has been transmitted to the control apparatus wirelessly. However, the input information may be transmitted by wire.

In the above embodiments, the pointer 2 that moves on the screen in accordance with the movement of the input apparatus 1 has been represented as an image of an arrow. However, the image of the pointer 2 is not limited to the arrow and may be a simple circle, square, or the like, or a character image or any other images.

The detection axes of each of the angular velocity sensor unit 15 and the acceleration sensor unit 16 of the sensor unit 17 do not necessarily need to be mutually orthogonal like the X' axis and the Y' axis described above. In this case, the accelerations respectively projected in the mutually-orthogonal axial directions can be obtained by a calculation that uses a trigonometric function. Similarly, the angular velocities about the mutually-orthogonal axes can be obtained by a calculation that uses the trigonometric function.

In the above embodiments, a case where the movement of the input apparatus 1 is converted into a movement of the pointer 2 so as to be displayed has been described. However, the present invention is not limited thereto, and the movement of the input apparatus 1 may be converted into a scroll operation or a zoom operation of an image displayed on the screen 3 and displayed.

Figure 30:
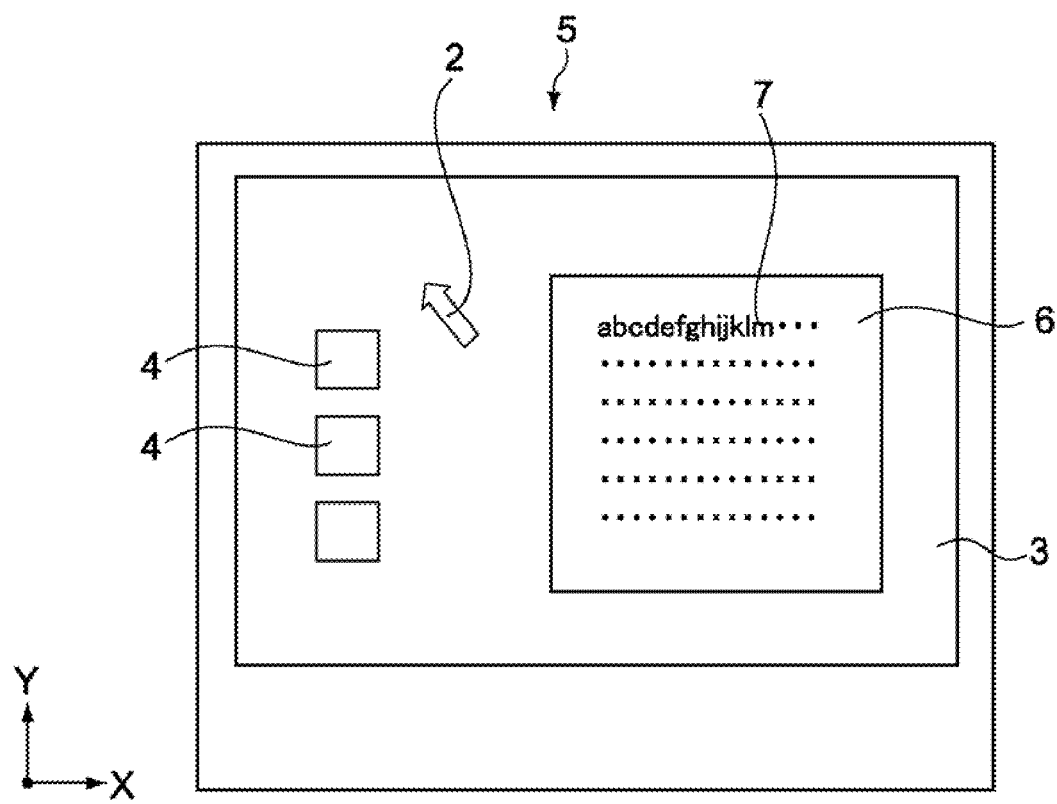
FIG. 30 is a diagram showing a state where an image including letters is displayed on the screen.
Figure 31A:
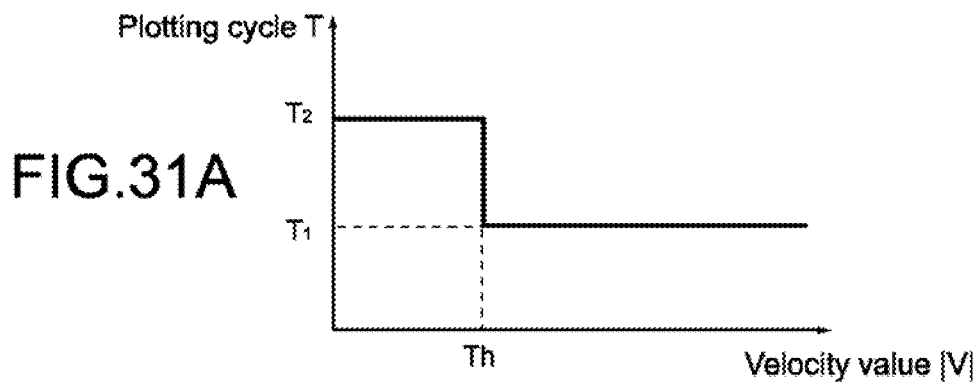
FIG. 31 are diagrams showing relationships between the plotting cycle and the velocity value.
Figure 31B:
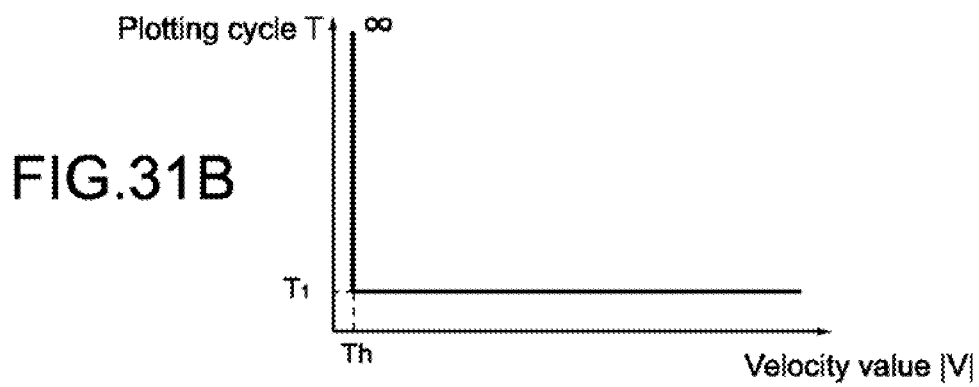
Figure 31C:
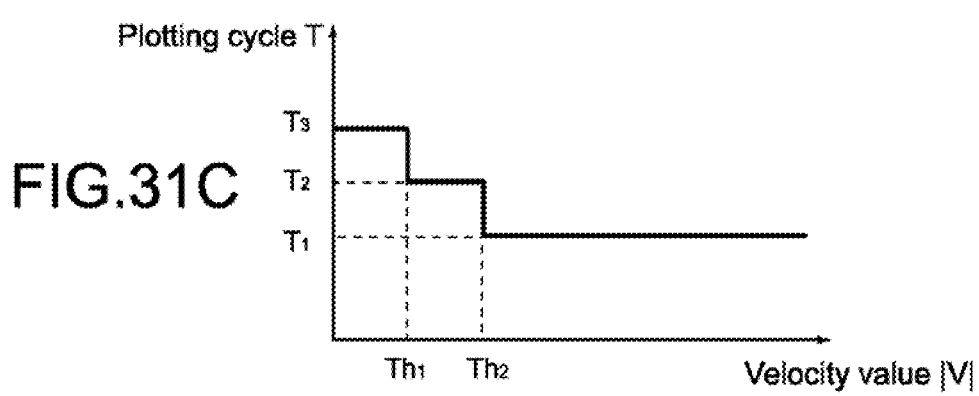
Figure 31D:
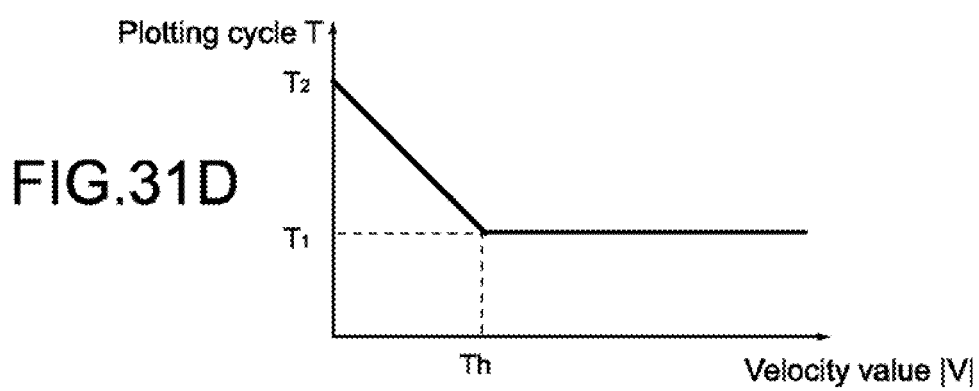
Figure 32A:
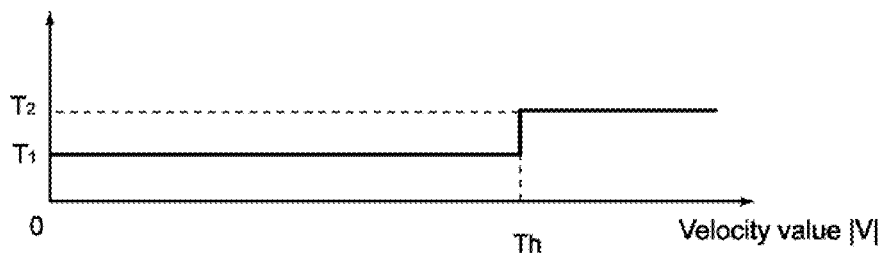
FIG. 32 are diagrams showing relationships between the plotting cycle and the velocity value.
Figure 32B:
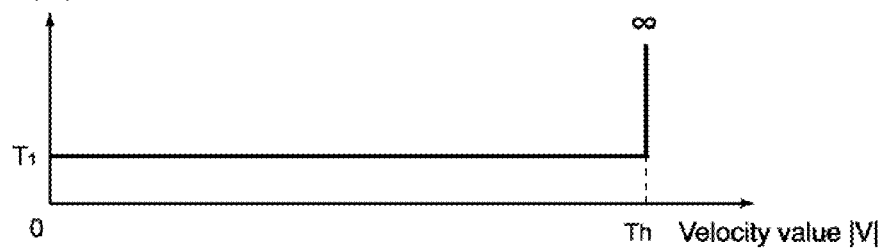
Figure 32C:
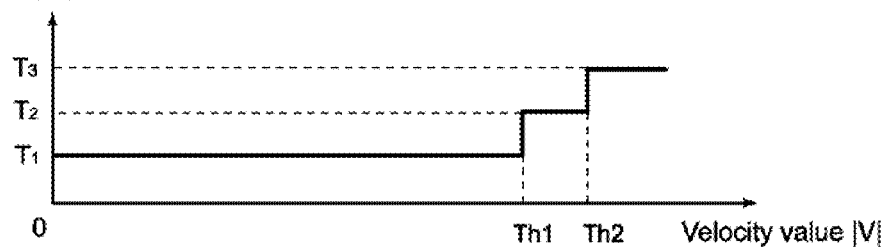
Figure 32D:
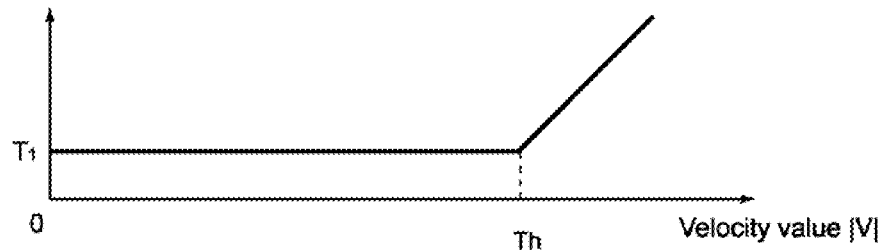

FIG. 30 is a diagram showing a state where an image 6 including letters 7 is displayed on the screen 3.

First, a scroll operation will be described. In this case, the MPU 35 of the control apparatus 40 controls display so that the letters 7 within the image 6 are scrolled in accordance with information on two velocity values ($V_x$, $V_y$) transmitted from the input apparatus 1. Alternatively, the MPU 35 may control display so that the letters 7 within the image 6 are scrolled in accordance with one of the first velocity value V, and the second velocity value $V_y$.

For example, when the user swings the input apparatus 1 in the pitch direction, the letters 7 are scrolled vertically inside the image 6 in accordance therewith, and when the user swings the input apparatus 1 in the yaw direction, the letters 7 are scrolled laterally in accordance therewith. A relationship between an operation direction of the input apparatus 1 and a direction in which the letters 7 are scrolled only needs to be set as appropriate.

Next, a zoom operation will be described. In this case, the MPU 35 controls display on the screen 3 so that the letters 7 within the image 6 are zoomed in/out in accordance with one of the first velocity value VX and the second velocity value $V_y$. For example, when the user swings the input apparatus 1 upward with a turn of a wrist from a reference position of the input apparatus 1, the letters 7 within the image 6 are zoomed in on the screen 3. On the other hand, when the user swings the input apparatus 1 downward from the reference position of the input apparatus 1, the letters 7 within the image 6 are zoomed out. A relationship between the operation direction of the input apparatus 1 and zoom in/out only needs to be set as appropriate.

By executing processing the same as those of the above embodiments also in the case of converting the movement of the input apparatus 1 into the scroll or zoom operation, the same operational effect as in the above embodiments can be obtained.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An input apparatus, comprising:
   a sensor to detect a movement of the input apparatus and output a detection signal corresponding to the movement of the input apparatus;
   a calculation means for calculating a corresponding value that corresponds to a movement of an image displayed on a screen in a predetermined calculation cycle, the corresponding value corresponding to the detection signal; and
   a transmission section to transmit the corresponding value in a transmission cycle shorter than the calculation cycle.

2. The input apparatus according to claim 1, further comprising:
   a memory to store the calculated corresponding value; and
   an update means for updating the corresponding value stored in the memory every time the corresponding value is calculated,
   wherein the transmission section reads and transmits the corresponding value stored in the memory in the transmission cycle.

3. The input apparatus according to claim 1, further comprising:
   a judgment means for judging whether the corresponding value is equal to or smaller than a predetermined threshold value; and
   a restriction means for restricting the transmission of the corresponding value when the corresponding value is equal to or smaller than the predetermined threshold value.

4. A control system, comprising:
   an input apparatus including
   a sensor to detect a movement of the input apparatus and output a detection signal corresponding to the movement of the input apparatus,
   a calculation means for calculating a corresponding value that corresponds to a movement of an image displayed on a screen in a predetermined calculation cycle, the corresponding value corresponding to the detection signal, and
   a transmission section to transmit the corresponding value in a transmission cycle shorter than the calculation cycle; and
   a control apparatus including
   a reception section to receive the transmitted corresponding value, and
   a display control means for controlling display of the screen so that the movement of the image is plotted in accordance with the corresponding value.

5. A control method, comprising:
   detecting a movement of an input apparatus and outputting a detection signal corresponding to the movement of the input apparatus;
   calculating a corresponding value that corresponds to a movement of an image displayed on a screen in a predetermined calculation cycle, the corresponding value corresponding to the detection signal; and
   transmitting the corresponding value in a transmission cycle shorter than the calculation cycle.

* * * * *